(12) United States Patent
Futae et al.

(10) Patent No.: US 10,288,112 B2
(45) Date of Patent: May 14, 2019

(54) FLOATING BUSH BEARING DEVICE AND SUPERCHARGER PROVIDED WITH THE SAME

(71) Applicant: MITSUBISHI HEAVY INDUSTRIES ENGINE & TURBOCHARGER, LTD., Sagamihara-shi, Kanagawa (JP)

(72) Inventors: Takaya Futae, Tokyo (JP); Yasuaki Jinnai, Tokyo (JP); Hiroshi Suzuki, Tokyo (JP); Takashi Nambu, Tokyo (JP); Noriyuki Hayashi, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 42 days.

(21) Appl. No.: 15/541,173

(22) PCT Filed: Feb. 10, 2015

(86) PCT No.: PCT/JP2015/053678
§ 371 (c)(1),
(2) Date: Jun. 30, 2017

(87) PCT Pub. No.: WO2016/129060
PCT Pub. Date: Aug. 18, 2016

(65) Prior Publication Data
US 2018/0258984 A1    Sep. 13, 2018

(51) Int. Cl.
F16C 17/18 (2006.01)
F16C 33/10 (2006.01)
F16C 17/02 (2006.01)

(52) U.S. Cl.
CPC ............ *F16C 17/18* (2013.01); *F16C 17/028* (2013.01); *F16C 33/1075* (2013.01); *F16C 33/1085* (2013.01); *F16C 2360/24* (2013.01)

(58) Field of Classification Search
CPC .. F16C 17/18; F16C 33/1075; F16C 33/1085; F16C 2360/24
See application file for complete search history.

(56) References Cited

U.S. PATENT DOCUMENTS 3,680,932 A * 8/1972 Raimondi ............. F01D 25/166
                                              384/291
4,602,873 A * 7/1986 Izumi ..................... F16O 27/02
                                              384/115

(Continued)

FOREIGN PATENT DOCUMENTS

CN    103261624 A    8/2013
EP    2 362 080 A2   8/2011

(Continued)

OTHER PUBLICATIONS

Decision of Rejection effective Mar. 29, 2018 issued to the corresponding JP Application No. 2016-574557 with a Machine Translation.

(Continued)

*Primary Examiner* — Alan B Waits
(74) *Attorney, Agent, or Firm* — Birch, Stewart, Kolasch & Birch, LLP

(57) ABSTRACT

A floating-bush bearing device (1) for rotatably supporting a rotational shaft (2), includes: a floating bush (3) having a cylindrical shape and including a bearing hole (33) into which the rotational shaft (2) is to be inserted; and a bearing housing (4) which rotatably houses the floating bush (3). At least one of an inner peripheral surface (31) of the floating bush (3), an outer peripheral surface (32) of the floating bush (3), or an inner peripheral surface (41) of the bearing housing (4) includes, in a cross section in an axial direction thereof, a plurality of land portions (311, 321, 411) having a true arc shape which is a part of a true circular shape, and a plurality of recess portions (312, 322, 412) being disposed (Continued)

at a position recessed from the land portions, the recess portions being configured such that a distance between the recess portions and a virtual true circular line (31*a*, 32*a*, 41*a*) passing through the land portions increases in a direction opposite from a rotational direction of the rotational shaft (2) from end portions (311*b*, 321*b*, 411*b*) of the land portions opposite from the rotational direction of the rotational shaft.

13 Claims, 16 Drawing Sheets

(56) References Cited

U.S. PATENT DOCUMENTS

| | | | |
|---|---|---|---|
| 4,747,705 A * | 5/1988 | Agrawal | F16C 17/028 384/118 |
| 5,725,314 A * | 3/1998 | Fannar | F16O 33/1075 384/118 |
| 5,944,427 A * | 8/1999 | Murabe | F16O 3/02 384/100 |
| 6,243,230 B1 | 6/2001 | Nii et al. | |
| 6,244,749 B1 | 6/2001 | Nakagawa et al. | |
| 6,469,866 B1 | 10/2002 | Nii et al. | |
| 8,646,979 B2 * | 2/2014 | Kashchenevsky | F16O 33/1075 384/114 |
| 9,581,195 B2 | 2/2017 | Nakamura | |
| 2003/0132678 A1 * | 7/2003 | Park | F16C 33/103 310/90 |
| 2007/0076991 A1 * | 4/2007 | Huang | F16C 17/02 384/107 |
| 2009/0074337 A1 * | 3/2009 | Kashchenevsky | F16O 32/06 384/111 |
| 2010/0143104 A1 | 6/2010 | Furman et al. | |
| 2014/0010647 A1 | 1/2014 | Nishida et al. | |
| 2015/0330442 A1 * | 11/2015 | Futae | F16C 17/18 415/111 |
| 2016/0010500 A1 * | 1/2016 | Kleinschmidt | F02B 39/14 415/111 |

FOREIGN PATENT DOCUMENTS

| | | |
|---|---|---|
| EP | 3 098 465 A1 | 11/2016 |
| JP | 58-142014 A | 8/1983 |
| JP | 59-168020 U | 11/1984 |
| JP | 61-30722 U | 2/1986 |
| JP | 1-193409 A | 8/1989 |
| JP | 8-219148 A | 8/1996 |
| JP | 2009-30474 A | 2/2009 |
| JP | 2009-167872 A | 7/2009 |
| JP | 2009-174466 A | 8/2009 |
| JP | 5477930 B1 | 2/2014 |
| WO | WO 2009/035548 A1 | 3/2009 |
| WO | WO 2014/097417 A1 | 6/2014 |

OTHER PUBLICATIONS

Office Action effective Dec. 5, 2017, issued to the corresponding JP Application No. 2016-574557 with an English Machine Translation.
Extended European Search Report effective Oct. 20, 2017, issued to the corresponding EP Application No. 15881935.9.
International Preliminary Report on Patentability effective Aug. 24, 2017, issued to International Application No. PCT/JP2015/053678 with English Translation.
International Search Report of PCT/JP2015/053678 dated May 19, 2015.
Office Action effective Jul. 2, 2018 issued to the corresponding Chinese Application No. 201580072623.2 with an English Translation.

* cited by examiner (a)

(b)

FLOATING BUSH BEARING DEVICE AND SUPERCHARGER PROVIDED WITH THE SAME

TECHNICAL FIELD

The present disclosure relates to a floating bush bearing device for rotatably supporting a rotational shaft and a supercharger provided with the floating bush bearing device.

BACKGROUND ART

In relation to bearing devices for rotatably supporting a rotational shaft, a floating bush bearing device is known, which includes a floating bush having a cylindrical shape and including a bearing hole into which a rotational shaft can be inserted (see Patent Document 1, for instance). Such a floating bush bearing device supplies a gap between a floating bush and a rotational shaft with lubricant oil to form an oil film, and rotatably supports the rotational shaft with the oil film formed in the gap.

Furthermore, in the floating bush bearing device disclosed in Patent Document 1, the circularity of the inner peripheral surface of the floating bush is changed into a polygonal shape to enhance the centering effect, thus improving the oscillation stability.

CITATION LIST

Patent Literature

Patent Document 1: JP5477930B

SUMMARY

Problems to be Solved

However, the present inventors found that, if the circularity is changed into a polygonal shape by machining the entire area of the inner peripheral surface of a floating bush like the floating bush bearing device disclosed in Patent Document 1, oscillation that does not synchronize with rotation of the rotational shaft (hereinafter, non-synchronous oscillation) is likely to occur. The present inventors conducted intensive researches to find out the reason for the above, and found that the non-synchronous oscillation is caused by machining tolerance that exists over the entire area of the inner peripheral surface of the floating bush when the inner peripheral surface of the floating bush is entirely machined.

At least one embodiment of the present invention was made in view of the above problem of the typical arts, and an object is to provide a floating bush bearing device with an excellent oscillation stability and a supercharger including the floating bush bearing device.

Solution to the Problems (1) A floating-bush bearing device for rotatably supporting a rotational shaft according to at least one embodiment of the present invention comprises: a floating bush having a cylindrical shape and including a bearing hole into which the rotational shaft is to be inserted; and a bearing housing which rotatably houses the floating bush. At least one of an inner peripheral surface of the floating bush, an outer peripheral surface of the floating bush, or an inner peripheral surface of the bearing housing includes, in a cross section in an axial direction thereof, a plurality of land portions having a true arc shape which is a part of a true circular shape, and a plurality of recess portions being disposed at a position recessed from the land portions, the recess portions being configured such that a distance between the recess portions and a virtual true circular line passing through the land portions increases in a direction opposite from a rotational direction of the rotational shaft from end portions of the land portions opposite from the rotational direction of the rotational shaft.

The land portions have a true arc shape, which is a part of a true circular shape, and thus it is possible to control the tolerance of the land portions to be smaller than the tolerance of the recess portions. Thus, according to the above embodiment (1), with at least one of the inner peripheral surface of the floating bush, the outer peripheral surface of the floating bush, or the inner peripheral surface of the bearing housing being formed to include the above land portions in a cross section in the axial direction, it is possible to suppress non-synchronous oscillation due to tolerance, and to enhance the oscillation stability.

Furthermore, the recess portions disposed at positions recessed from the land portions are configured such that a distance from the virtual true circular line passing through the land portions increases from the end portions of the land portions opposite to the rotational direction of the rotational shaft toward a direction opposite to the rotational direction of the rotational shaft. With such recess portions, the gap in the circumferential direction become uneven, which provokes shortage of lubricant oil at sections where the gaps are large. If the lubricant oil falls short as described above partially in the circumferential direction, the axis eccentricity ratio increases and thereby the oscillation stability increases, according to the findings of the present inventors. Thus, according to the above embodiment (1), with at least one of the inner peripheral surface of the floating bush, the outer peripheral surface of the floating bush, or the inner peripheral surface of the bearing housing being formed to include the above recess portions in a cross section in the axial direction thereof, it is possible to provoke shortage of lubricant oil to enhance the oscillation stability.

(2) In some embodiments, in the above described floating bush bearing device (1), the inner peripheral surface of the floating bush is formed so as to include each of the land portions and the recess portions in a cross section in the axial direction of the floating bush.

According to the above embodiment (2), the gap between the rotational shaft and the land portions of the inner peripheral surface of the floating bush is controlled with high accuracy, and thereby it is possible to suppress non-synchronous oscillation due to tolerance, and to enhance the oscillation stability. Furthermore, a large section of the gap is formed between the rotational shaft and the inner peripheral surface of the floating bush, and thereby it is possible to provoke shortage of lubricant oil in the large section of the gap to enhance the oscillation stability.

(3) In some embodiments, in the above described floating bush bearing device (1) or (2), the outer peripheral surface of the floating bush is formed so as to include each of the land portions and the recess portions in a cross section in the axial direction of the floating bush.

According to the above embodiment (3), the gap between the land portion of the outer peripheral surface of the floating bush and the inner peripheral surface of the bearing housing is controlled with high accuracy, and thereby it is possible to suppress non-synchronous oscillation due to tolerance, and to enhance the oscillation stability. Furthermore, a large section of the gap is formed between the land portion of the outer peripheral surface of the floating bush and the inner peripheral surface of the bearing housing, and thereby it is possible to provoke shortage of lubricant oil in the large section of the gap to enhance the oscillation stability.

(4) In some embodiments, in the floating bush bearing device according to any one of the above (1) to (3), the inner peripheral surface of the floating bush is formed so as to include each of the land portions and the recess portions in a cross section in the axial direction of the floating bush. The outer peripheral surface of the floating bush is formed so as to include each of the land portions and the recess portions in a cross section in the axial direction of the floating bush. The land portions on the inner peripheral surface of the floating bush and the land portions on the outer peripheral surface of the floating bush are formed in regions which overlap with each other in a circumferential direction. The recess portions on the inner peripheral surface of the floating bush and the recess portions on the outer peripheral surface of the floating bush are formed in regions which overlap with each other in the circumferential direction.

With the above embodiment (4), the gap between the rotational shaft and the land portion of the inner peripheral surface of the floating bush and the gap between the land portion of the outer peripheral surface of the floating bush and the inner peripheral surface of the bearing housing are controlled with high accuracy, and thereby it is possible to suppress non-synchronous oscillation due to tolerance, and to enhance the oscillation stability. Furthermore, large sections of the gaps are formed between the rotational shaft and the inner peripheral surface of the floating bush and between the land portion of the outer peripheral surface of the floating bush and the inner peripheral surface of the bearing housing, and thereby it is possible to provoke shortage of lubricant oil in the large sections of the gap to enhance the oscillation stability.

(5) In some embodiments, in the floating bush bearing device according to any one of the above (2) to (4), the floating bush includes an oil supply hole formed through a peripheral wall of the floating bush having a cylindrical shape. The oil supply hole is formed at a position which overlaps with an end portion of the land portions on a side of the rotational direction of the rotational shaft, or an end portion of the recess portions on a side opposite from the rotational direction of the rotational shaft, as seen in the axial direction.

With the above embodiment (5), the oil supply hole is formed on a position where the distance from the true circular line is greatest, or in the vicinity of the position, on the recess portion. Thus, with the oil supply hole formed on such a position, it is possible to increase the flow rate of lubricant oil that flows from the outer peripheral side of the floating bush toward the inner peripheral side of the floating bush.

(6) In some embodiments, in the floating bush bearing device according to any one of the above (1) to (5), the inner peripheral surface of the bearing housing is formed to include each of the land portions and the recess portions in a cross section in the axial direction of the bearing housing.

With the above embodiment (6), the gap between the land portion of the inner peripheral surface of the bearing housing and the outer peripheral surface of the floating bush is controlled with high accuracy, and thereby it is possible to suppress non-synchronous oscillation due to tolerance, and to enhance the oscillation stability. Furthermore, a large section of the gap is formed between the inner peripheral surface of the bearing housing and the outer peripheral surface of the floating bush, and thereby it is possible to provoke shortage of lubricant oil in the large section of the gap to enhance the oscillation stability.

(7) In some embodiments, in the floating bush bearing device according to any one of the above (1) to (6), the land portions and the recess portions formed on at least one of the inner peripheral surface of the floating bush, the outer peripheral surface of the floating bush, or the inner peripheral surface of the bearing housing are formed continuously over the axial direction of the bearing housing or the floating bush. The recess portions are formed so that a distance between the recess portions and the virtual true circular line changes in the axial direction.

With the above embodiment (7), the distance between the recess portion and the virtual true circular line changes in the axial direction. With such recess portions, the gap in the axial direction become uneven, which provokes shortage of lubricant oil at sections where the gaps are large. Thus, with at least one of the inner peripheral surface of the floating bush, the outer peripheral surface of the floating bush, or the inner peripheral surface of the bearing housing being formed to include the above recess portions, it is possible to provoke shortage of lubricant oil to enhance the oscillation stability.

(8) In some embodiments, in the floating bush bearing device (7), the recess portions are formed so that the distance between the recess portions and the virtual true circular line increases from a first end side toward a second end side in the axial direction.

With the above embodiment (8), the gap in the axial direction become uneven, which provokes shortage of lubricant oil at sections where the gaps are large. Thus, it is possible to provoke shortage of lubricant oil to enhance the oscillation stability.

(9) In some embodiments, in the floating bush bearing device (7) or (8), the inner peripheral surface of the floating bush is formed so as to include each of the land portions and the recess portions in a cross section in the axial direction of the floating bush. The outer peripheral surface of the floating bush is formed so as to include each of the land portions and the recess portions in a cross section in the axial direction of the floating bush. Each of the recess portions on the inner peripheral surface of the floating bush and the recess portions on the outer peripheral surface of the floating bush is formed so that a distance between the recess portion and the virtual true circular line increases from a first end side toward a second end side in the axial direction.

With the above embodiment (9), large sections of the gaps are formed on the second end side in the axial direction, between the rotational shaft and the inner peripheral surface of the floating bush, and between the outer peripheral surface of the floating bush and the inner peripheral surface of the bearing housing. Thus, it is possible to provoke shortage of lubricant oil at the large sections of the gap to enhance the oscillation stability.

(10) In some embodiments, in the floating bush bearing device (7) or (8), the inner peripheral surface of the floating bush is formed so as to include each of the land portions and the recess portions in a cross section in the axial direction of the floating bush. The outer peripheral surface of the floating bush is formed so as to include each of the land portions and the recess portions in a cross section in the axial direction of the floating bush. The recess portions on the inner peripheral surface of the floating bush are formed so that a distance between the recess portions and the virtual true circular line increases from a first end side toward a second end side in the axial direction. The recess portions on the outer peripheral surface of the floating bush are formed so that a distance between the recess portions and the virtual true circular line increases from the second end side toward the first end side in the axial direction.

With the above embodiment (10), a large section of the gap is formed on the second end side in the axial direction, between the rotational shaft and the inner peripheral surface of the floating bush. Further, a large section of the gap is formed on the first end side in the axial direction, between the outer peripheral surface of the floating bush and the inner peripheral surface of the bearing housing. Thus, it is possible to provoke shortage of lubricant oil at the large sections of the gap to enhance the oscillation stability.

(11) In some embodiments, in the floating bush bearing device (7), the floating bush includes an oil supply hole formed through a peripheral wall of the floating bush having a cylindrical shape. The inner peripheral surface of the floating bush is formed so as to include each of the land portions and the recess portions in a cross section in the axial direction of the floating bush. The recess portions on the inner peripheral surface of the floating bush is formed so that a distance between the recess portions and the virtual true circular line increases from a first end side and a second end side in the axial direction toward the oil supply hole.

According to the above embodiment (11), the recess portion on the inner peripheral surface of the floating bush is configured such that the gap is greatest in the vicinity of the oil supply hole, and decreases toward the first end side and the second end side from the oil supply hole in the axial direction. Thus, it is possible to provoke shortage of lubricant oil at the large section of the gap to enhance the oscillation stability. Furthermore, lubricant oil supplied between the rotational shaft and the inner peripheral surface of the floating bush is less likely to leak from the first end side and the second end side in the axial direction, and thus it is possible to avoid an event in which lubricant oil falls short over the entire length in the circumferential direction and the axial direction.

(12) In some embodiments, in the floating bush bearing device according to any one of the above (7) to (11), the floating bush includes an oil supply hole formed through a peripheral wall of the floating bush having a cylindrical shape. The outer peripheral surface of the floating bush is formed so as to include each of the land portions and the recess portions in a cross section in the axial direction of the floating bush. The recess portions on the outer peripheral surface of the floating bush are formed so that a distance between the recess portions and the virtual true circular line increases from a first end side and a second end side in the axial direction toward the oil supply hole.

According to the above embodiment (12), the recess portion on the outer peripheral surface of the floating bush is formed so that the gap is greatest in the vicinity of the oil supply hole, and decreases from the first end side and the second end side toward the oil supply hole in the axial direction. Thus, it is possible to provoke shortage of lubricant oil at the large section of the gap to enhance the oscillation stability. Furthermore, lubricant oil supplied between the rotational shaft and the inner peripheral surface of the floating bush is less likely to leak from the first end side and the second end side in the axial direction, and thus it is possible to avoid an event in which lubricant oil falls short over the entire length in the circumferential direction and the axial direction. Moreover, it is possible to increase the flow rate of lubricant oil supplied to the inner peripheral side of the floating bush.

(13) In some embodiments, in the floating bush bearing device according to any one of the above (1) to (6), a center line of the inner circumferential surface of the floating bush is inclined from a center line of the rotational shaft, or a center line of the outer peripheral surface of the floating bush is inclined from a center line of the inner peripheral surface of the bearing housing.

According to the above embodiment (3), the gap between the rotational shaft and the inner peripheral surface of the floating bush, or the gap between the outer peripheral surface of the floating bush and the inner peripheral surface of the bearing housing are uneven in the axial direction, which provokes shortage of lubricant oil at the large sections of the gap. Thus, it is possible to provoke shortage of lubricant oil to enhance the oscillation stability.

(14) In some embodiments, in the floating bush bearing device according to any one of the above (1) to (13), the recess portions formed on the inner peripheral surface of the floating bush are formed by machining the inner peripheral surface of the floating bush having a true circular shape, the recess portions formed on the outer peripheral surface of the floating bush are formed by machining the outer peripheral surface of the floating bush having a true circular shape, or the recess portions formed on the inner peripheral surface of the bearing housing are formed by machining the inner peripheral surface of the bearing housing having a true circular shape.

According to the above embodiment (14), the recess portion if formed by machining the inner peripheral surface and the outer peripheral surface of a typical floating bush having a true circular shape and the inner peripheral surface of a bearing housing. Thus, for instance, extensive reconstruction of an ongoing production line is not necessary, which is advantageous in terms of productivity and costs.

(15) A supercharger according to at least one embodiment of the present invention comprises: a rotational shaft; a compressor wheel coupled to an end portion of the rotational shaft; and the floating bush bearing device according to any one of the above (1) to (14).

According to the above embodiment (15), it is possible to provide a supercharger having an excellent oscillation stability.

Advantageous Effects

According to at least one embodiment of the present invention, it is possible to provide a floating bush bearing device with an excellent oscillation stability and a supercharger including the floating bush bearing device.

DETAILED DESCRIPTION

Figure 1:
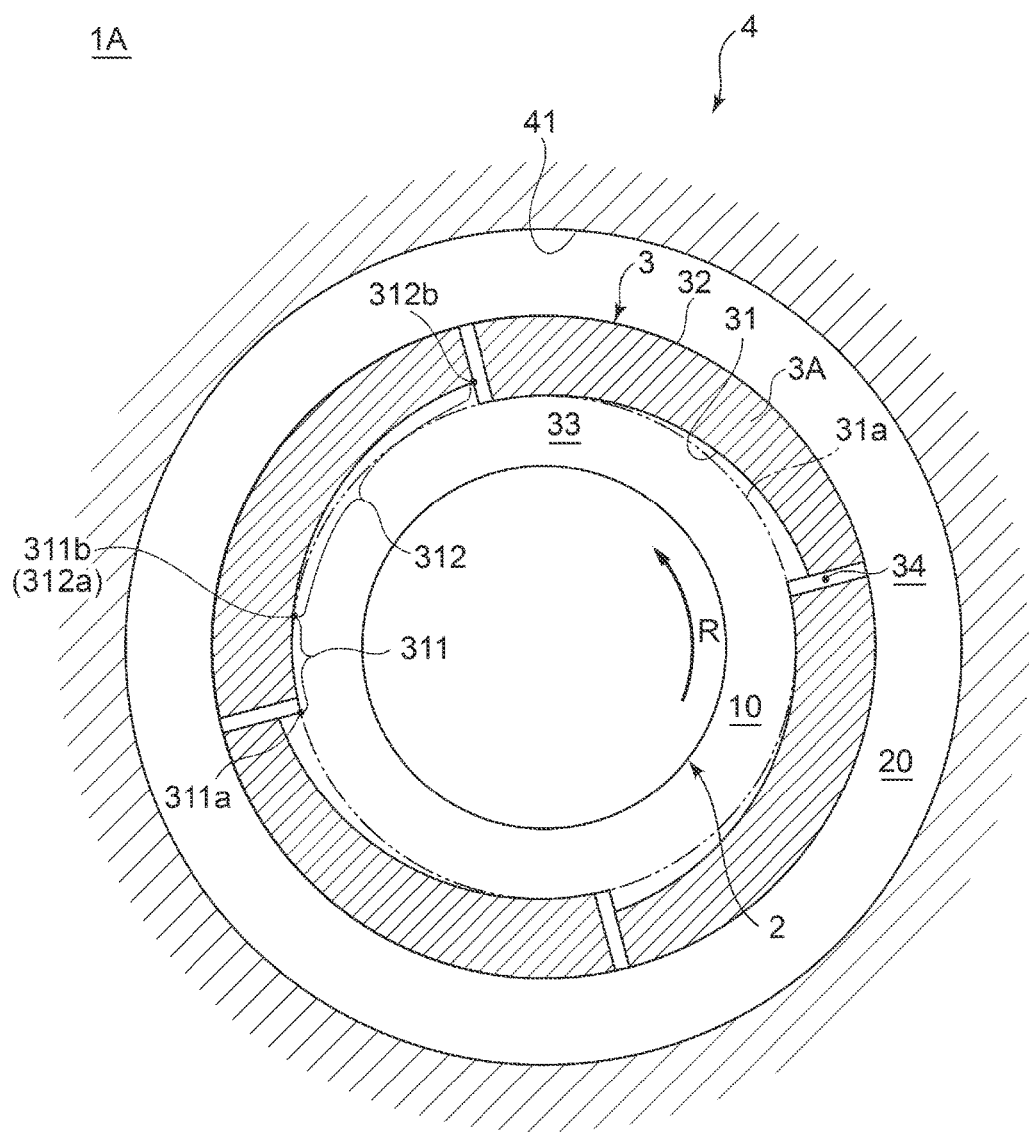
FIG. 1 is a cross-sectional view of a cross section of a floating bush bearing device according to an embodiment of the present invention, taken along the axial direction.

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Further, in the description below, some the same features are associated with the same reference numerals and not described again.

FIGS. 1 to 5 are each a cross-sectional view of a cross section of a floating bush bearing device according to an embodiment of the present invention, taken along the axial direction. FIG. 6A is an explanatory diagram for explaining a cross-sectional shape of a land portion and a recess portion, in a floating bush bearing device according to an embodiment of the present invention. FIG. 6B is an explanatory diagram for explaining a relative position of a land portion and a recess portion formed on an inner peripheral surface and an outer peripheral surface of a floating bush, in a floating bush bearing device according to an embodiment of the present invention.

A floating bush bearing device 1 (1A to 1E) according to an embodiment of the present invention is a device for rotatably supporting the rotational shaft 2, and includes a floating bush 3 and a bearing housing 4 as depicted in FIGS. 1 to 5.

The floating bush 3 is a cylindrical member having a bearing hole 33 into which the rotational shaft 2 is insertable. A gap 10 between an inner peripheral surface 31 of the floating bush 3 and the rotational shaft 2 is supplied with lubricant oil that forms an oil film, and the oil film formed in the gap 10 rotatably supports the rotational shaft 2.

A bearing housing 4 is a member for rotatably housing the floating bush 3. Lubricant oil is also supplied to a gap 20 between an outer peripheral surface 32 of the floating bush 3 and an inner peripheral surface 41 of the bearing housing 4 to form an oil film, and the oil film formed in the gap 20 rotatably supports the floating bush 3 which rotates along with the rotational shaft 2 in the same direction as the rotational direction R of the rotational shaft 2.

Furthermore, as depicted in FIGS. 1 to 5, at least one of the inner peripheral surface 31 of the floating bush 3, the outer peripheral surface 32 of the floating bush 3, or the inner peripheral surface 41 of the bearing housing 4 is formed to include a plurality of land portions 311, 321, 411, and a plurality of recess portions 312, 322, 412 in a cross section in the axial direction. The land portions 311, 321, 411 have a true arc shape, which is a part of a true circular shape. The recess portions 312, 322, 412 are at positions recessed from the land portions 311, 321, 411. The recess portions 312, 322, 412 are configured such that a distance from a virtual true circular line 31a, 32a, 41a passing through the land portions 311, 321, 411 increases from end portions 311b, 321b, 411b of the land portions 311, 321, 411 opposite to the rotational direction R of the rotational shaft 2 toward a direction opposite to the rotational direction R of the rotational shaft 2.

The tolerance of the land portions 311, 321, 411 having a true arc shape, which is a part of a true circular shape, can be controlled to be small compared to the tolerance of the recess portions 312, 322, 412. Thus, according to this embodiment, with at least one of the inner peripheral surface 31 of the floating bush 3, the outer peripheral surface 32 of the floating bush 3, or the inner peripheral surface 41 of the bearing housing 4 being formed to include the above land portions 311, 321, 411 in a cross section in the axial direction, it is possible to suppress non-synchronous oscillation due to tolerance to enhance the oscillation stability.

Furthermore, the recess portions 312, 322, 412 disposed at positions recessed from the land portions 311, 321, 411 are configured such that a distance from the virtual true circular line 31a, 32a, 41a passing through the land portions 311, 321, 411 increases from the end portions of the land portions 311, 321, 411 opposite to the rotational direction R of the rotational shaft 2 toward a direction opposite to the rotational direction R of the rotational shaft 2. With such recess portions 312, 322, 412, the gap 10, 20 in the circumferential direction become uneven, which provokes shortage of lubricant oil at sections where the gap 10, 20 are large. If the lubricant oil falls short as described above partially in the circumferential direction, the axis eccentricity ratio increases and thereby the oscillation stability increases, according to the findings of the present inventors. Thus, according to this embodiment, with at least one of the inner peripheral surface 31 of the floating bush 3, the outer peripheral surface 32 of the floating bush 3, or the inner peripheral surface 41 of the bearing housing 4 being formed to include the above recess portions 312, 322, 412 in a cross section in the axial direction thereof, it is possible to provoke shortage of lubricant oil to enhance the oscillation stability.

In the depicted embodiment, four land portions 311, 321, 411, and four recess portions 312, 322, 412 are formed at a regular interval in the circumferential direction. Further, the recess portions 312, 322, 412 are formed into an arc shape, which is a part of a true circular shape, of an ellipse shape, or of an oval shape, for instance. However, the number of the land portions 311, 321, 411 and the recess portions 312, 322, 412 in the circumferential direction is not particularly limited. Further, the shape of the recess portions 312, 322, 412 is not limited to an arc shape. The shape may be a part of a polygon composed of a plurality of straight lines "a" to "e" as depicted in FIG. 6A(a), or may be formed of a single line "f" as depicted in FIG. 6A(b).

Furthermore, in the depicted embodiment, an expression θ1<θ2 is satisfied, where θ1 is an angular range showing a region in which the land portions 311, 321, 411 are formed, and θ2 is an angular range showing a region in which the recess portion 312, 322, 412 are formed. However, the relationship between θ1 and θ2 is not limited to θ1<θ2. The relationship may be θ1=θ2 as depicted in FIG. 6A (b), or θ1>θ2, though not depicted.

Figure 4:
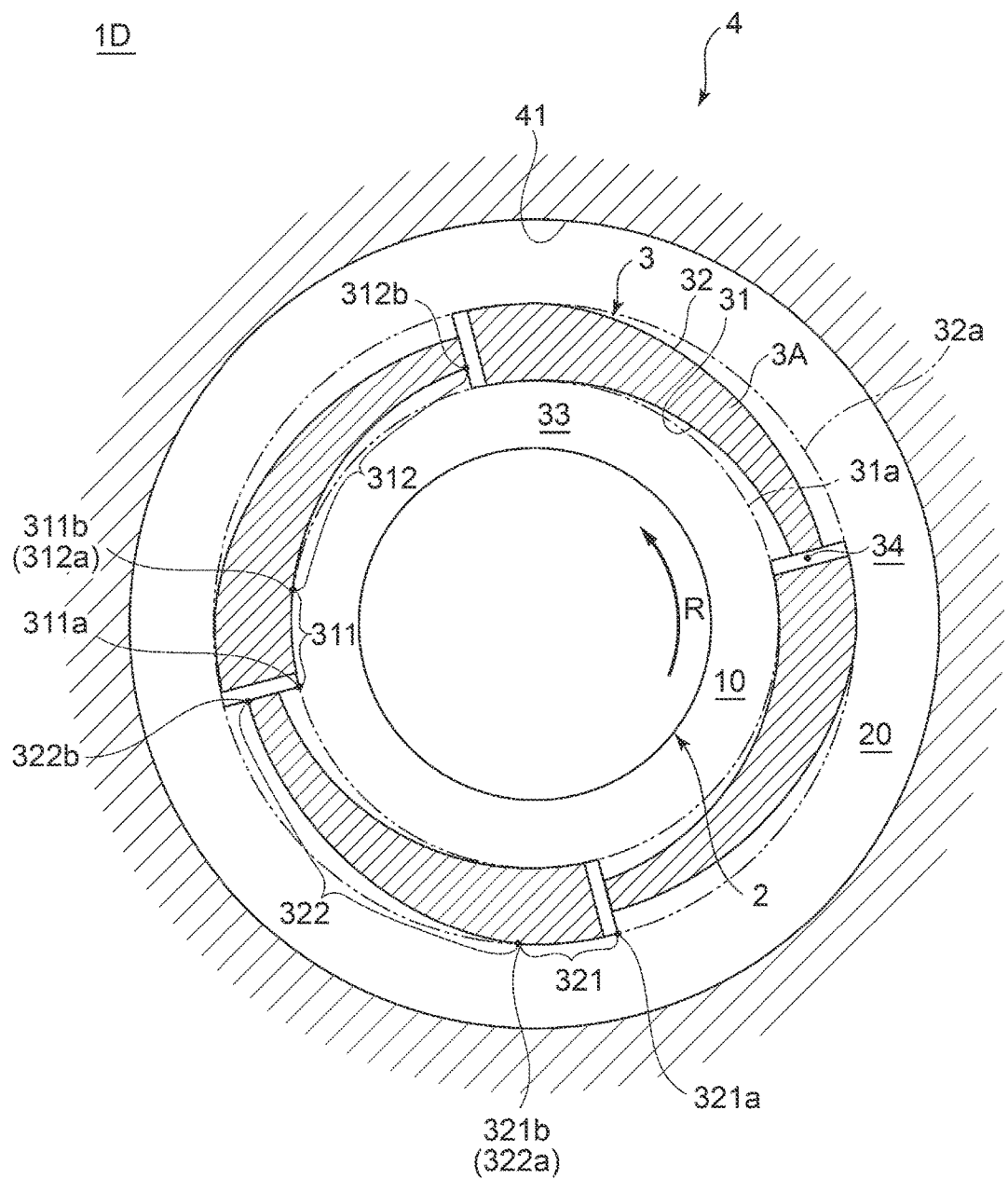
FIG. 4 is a cross-sectional view of a cross section of a floating bush bearing device according to an embodiment of the present invention, taken along the axial direction.
Figure 5:
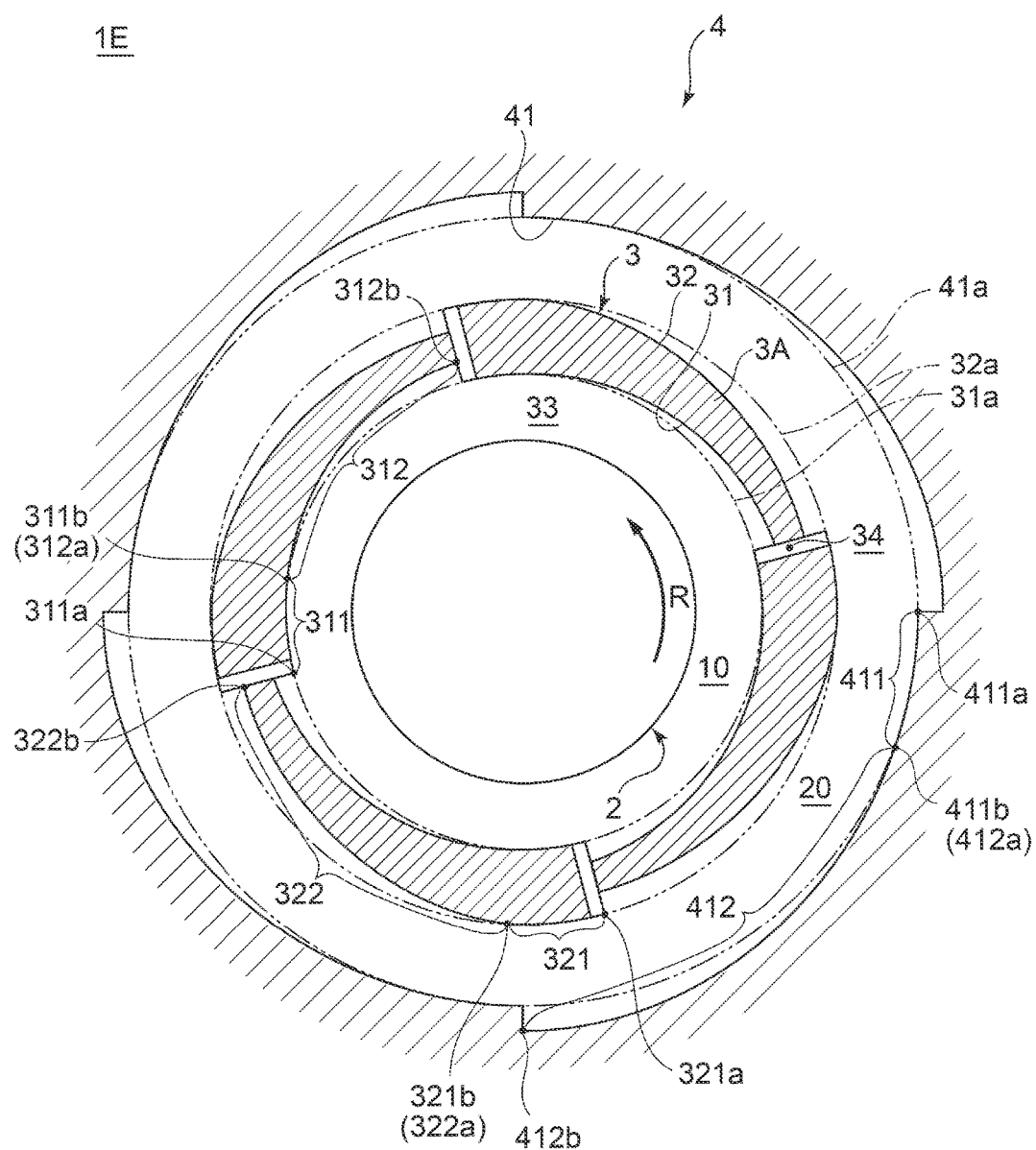
FIG. 5 is a cross-sectional view of a cross section of a floating bush bearing device according to an embodiment of the present invention, taken along the axial direction.
Figure 6A:
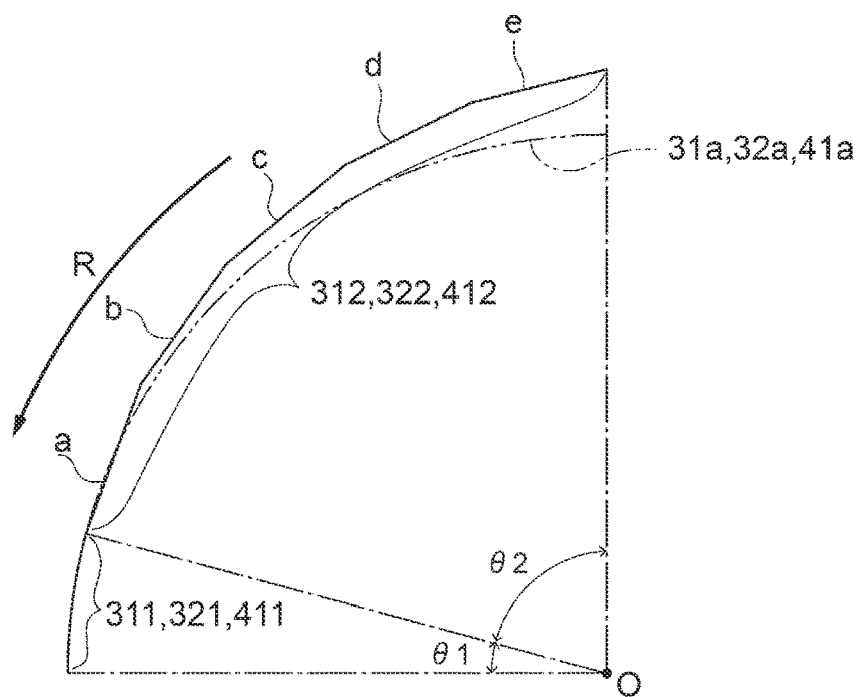
FIG. 6A is an explanatory diagram for explaining a cross-sectional shape of a land portion and a recess portion, in a floating bush bearing device according to an embodiment of the present invention.
Figure 6A:
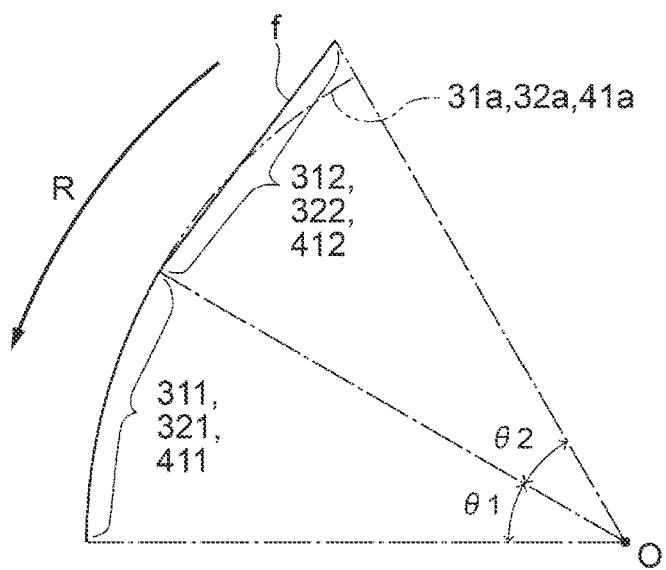
Figure 6B:
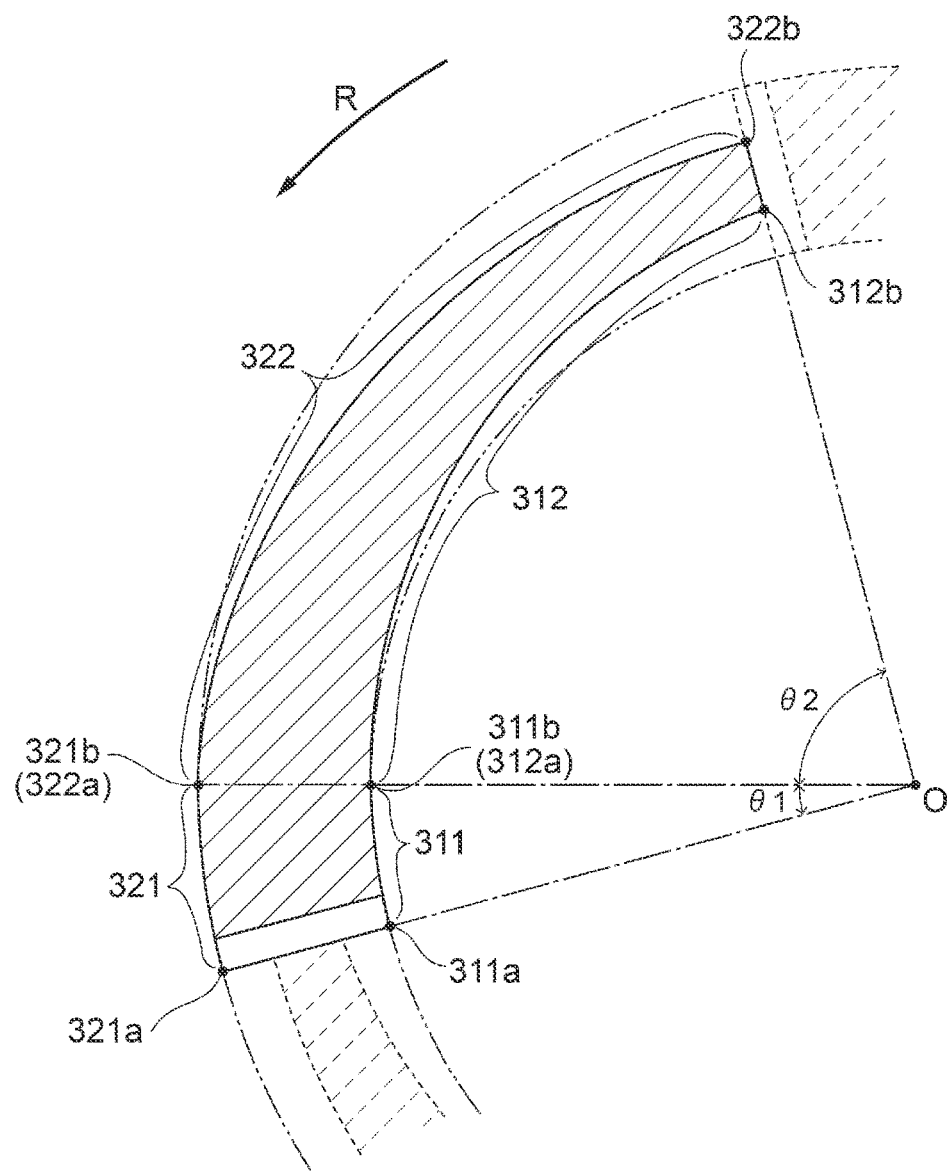
FIG. 6B is an explanatory diagram for explaining a relative position of a land portion and a recess portion formed on an inner peripheral surface and an outer peripheral surface of a floating bush, in a floating bush bearing device according to an embodiment of the present invention.

In some embodiments, as depicted in FIGS. 1, 4, and 5, in the floating bush bearing device 1 (1A, 1D, 1E), the inner peripheral surface 31 of the floating bush 3 may be formed to include each of the land portions 311 and the recess portions 312 in a cross section in the axial direction of the floating bush 3.

In the depicted embodiment of FIG. 1, the land portion 311 is formed from the end portion 311a to the end portion 311b in a direction opposite to the rotational direction R. The recess portion 312 is formed from the end portion 312a to the end portion 312b in a direction opposite to the rotational direction R. The end portion 311b of the land portion 311 is at the same position as the end portion 312a of the recess portion 312.

According to this embodiment, the gap 10 between the rotational shaft 2 and the land portion 311 of the inner peripheral surface 31 of the floating bush 3 is controlled with high accuracy, and thereby it is possible to suppress non-synchronous oscillation due to tolerance to enhance the oscillation stability. Furthermore, large sections are formed in the gap 10 between the rotational shaft 2 and the inner peripheral surface 31 of the floating bush 3, and thereby it is possible to provoke shortage of lubricant oil in the large sections of the gap 10 to enhance the oscillation stability.

Figure 2:
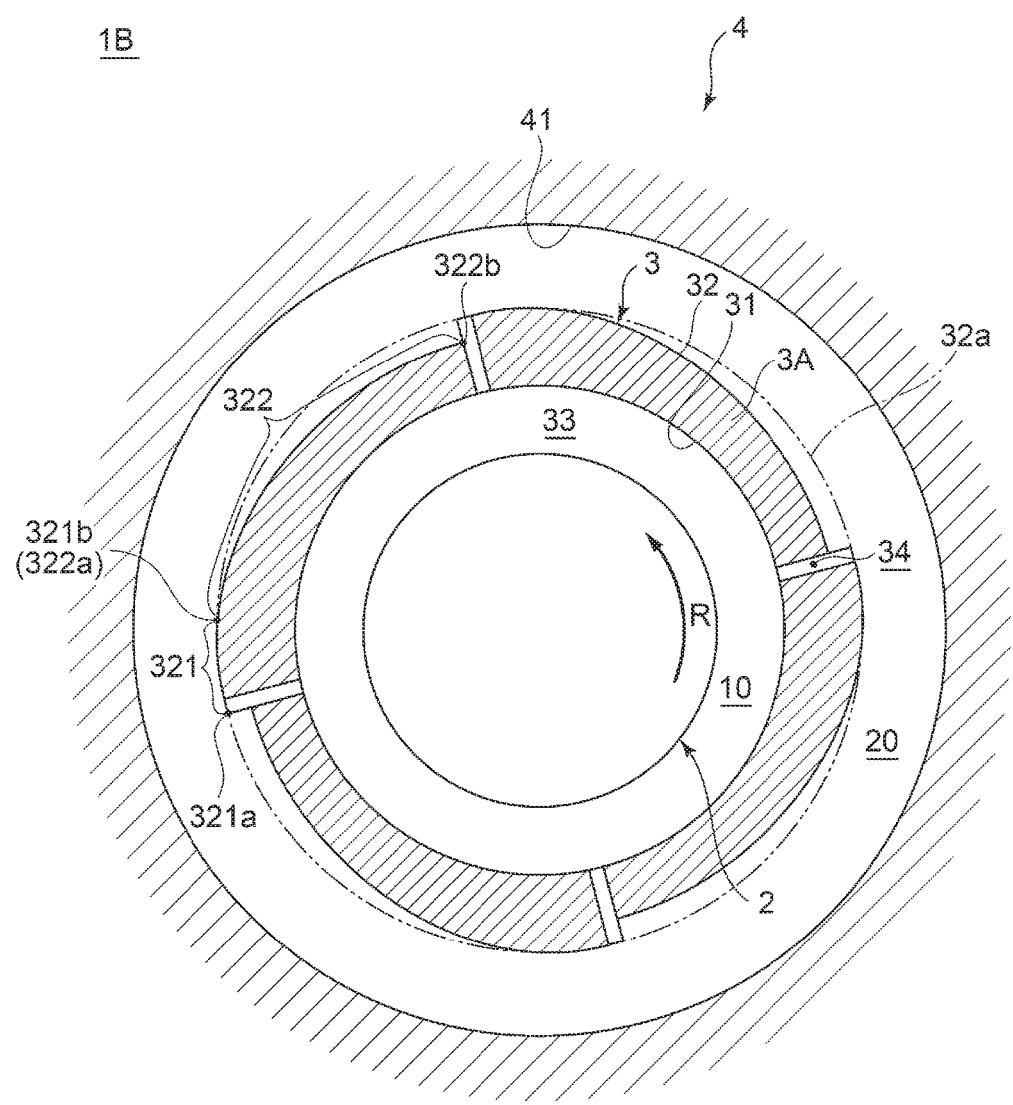
FIG. 2 is a cross-sectional view of a cross section of a floating bush bearing device according to an embodiment of the present invention, taken along the axial direction.

In some embodiments, as depicted in FIGS. 2, 4, and 5, in the floating bush bearing device 1 (1B, 1D, 1E), the outer peripheral surface 32 of the floating bush 3 may be formed to include each of the land portions 321 and the recess portions 322 in a cross section in the axial direction of the floating bush 3.

In the depicted embodiment of FIG. 2, the land portion 321 is formed from the end portion 321a to the end portion 321b a direction opposite to the rotational direction R. The recess portion 322 is formed from the end portion 322a to the end portion 322b in a direction opposite to the rotational direction R. The end portion 321b of the land portion 321 is at the same position as the end portion 322a of the recess portion 322.

According to this embodiment, the gap 20 between the land portion 321 of the outer peripheral surface 32 of the floating bush 3 and the inner peripheral surface 41 of the bearing housing 4 is controlled with high accuracy, and thereby it is possible to suppress non-synchronous oscillation due to tolerance to enhance the oscillation stability. Furthermore, large sections are formed in the gap 20 between the outer peripheral surface 32 of the floating bush 3 and the inner peripheral surface 41 of the bearing housing 4, and thereby it is possible to provoke shortage of lubricant oil in the large sections of the gap 20 to enhance the oscillation stability.

In some embodiments, as depicted in FIGS. 4, and 5, in the floating bush bearing device 1 (1D, 1E), the inner peripheral surface 31 of the floating bush 3 may be formed to include each of the land portions 311 and the recess portions 312 in a cross section in the axial direction of the floating bush 3. Furthermore, the outer peripheral surface 32 of the floating bush 3 may be formed to include each of the land portion 321 and the recess portion 322 in a cross section in the axial direction of the floating bush 3. Further, the land portion 311 of the inner peripheral surface 31 of the floating bush 3 and the land portion 321 of the outer peripheral surface 32 of the floating bush 3 are formed in regions that overlap with each other in the circumferential direction. Further, the recess portion 312 of the inner peripheral surface 31 of the floating bush 3 and the recess portion 322 of the outer peripheral surface 32 of the floating bush 3 are formed in regions that overlap with each other in the circumferential direction.

Herein, "the land portion 311 and the land portion 321 are formed in regions that overlap with each other in the circumferential direction" refers to an embodiment depicted in FIG. 6B. Specifically, as depicted in FIG. 6B, the angular range θ1 representing a region in which the land portion 311 is formed and the angular range θ1 representing a region in which the land portion 321 is formed have the same angle. In other words, the center point O of the land portion 311 having a true arc shape and the center point O of the land portion 321 having a true arc shape are at the same position. Furthermore, the center point O, the end portion 311a of the land portion 311 and the end portion 321a of the land portion 321 are on the same radial line. Furthermore, the center point O, the end portion 311b of the land portion 311 and the end portion 321b of the land portion 321 on the same radial line.

Furthermore, "the recess portion 312 and the recess portion 322 are formed in regions that overlap with each other in the circumferential direction" refers to an embodiment depicted in FIG. 6B. Specifically, as depicted in FIG. 6B, the angular range θ2 representing a region in which the recess portion 321 is formed and the angular range θ2 representing a region in which the recess portion 322 is formed have the same angle. Furthermore, the center point O, the end portion 312a of the recess portion 312 and the end portion 321a of the recess portion 322 are on the same radial line. Furthermore, the center point O, the end portion 312b of the recess portion 312 and the end portion 321b of the recess portion 322 are on the same radial line.

According to this embodiment, the gap 10 between the rotational shaft 2 and the land portion 311 of the inner peripheral surface 31 of the floating bush 3 and the gap 20 between the land portion 321 of the outer peripheral surface 32 of the floating bush 3 and the inner peripheral surface 41 of the bearing housing 4 are controlled with high accuracy, and thereby it is possible to suppress non-synchronous oscillation due to tolerance to enhance the oscillation stability. Furthermore, large sections of the gaps 10, 20 are formed between the rotational shaft 2 and the inner peripheral surface 31 of the floating bush 3 and between the land portion 321 of the outer peripheral surface 32 of the floating bush 3 and the inner peripheral surface 41 of the bearing housing 4, and thereby it is possible to provoke shortage of lubricant oil in the large sections of the gap to enhance the oscillation stability.

In some embodiments, as depicted in FIGS. 1, 2, 4 and 5, in the floating bush bearing device 1 (1A, 1B, 1D, 1E), the floating bush 3 includes an oil supply hole 34 formed through a peripheral wall 3A of the floating bush 3 having a cylindrical shape. Further, the oil supply hole 34 is disposed on a position overlapping with the end portion 311a, 321a of the land portion 311, 321 on the side of the rotational direction R of the rotational shaft 2, or with the end portion 312b of the recess portion 312, 322 on the opposite side from the rotational direction R of the rotational shaft 2, as seen in the axial direction.

In the depicted embodiment, the oil supply hole 34 is formed on a position overlapping with the end portion 311a, 321a of the land portion 311, 321 on the side of the rotational direction R of the rotational shaft 2, as seen in the axial direction. In other words, the oil supply hole 34 is disposed on the position closest to the side of the rotational direction R on the land portion 311, 321. However, though not depicted, the oil supply hole 34 may be formed on a position overlapping with the end portion 312b, 322b of the recess portion 312, 322 on the opposite side from the rotational direction R of the rotational shaft 2, as seen in the axial direction. In other words, the oil supply hole 34 may be formed on the position most opposite from the side of the rotational direction R on the recess portion 312, 322

In the depicted embodiment, four oil supply holes 34 are formed at a regular interval in the circumferential direction. However, the number of oil supply holes 34 is not particularly limited.

According to this embodiment, the oil supply hole 34 is formed on a position where the distance from the true circular line 31a, 32a is greatest, or in the vicinity of the position, on the recess portion 312, 322. Thus, with the oil supply hole 34 formed on such a position, it is possible to increase the flow rate of lubricant oil that flows from the outer peripheral side of the floating bush 3 toward the inner peripheral side of the floating bush 3.

Figure 3:
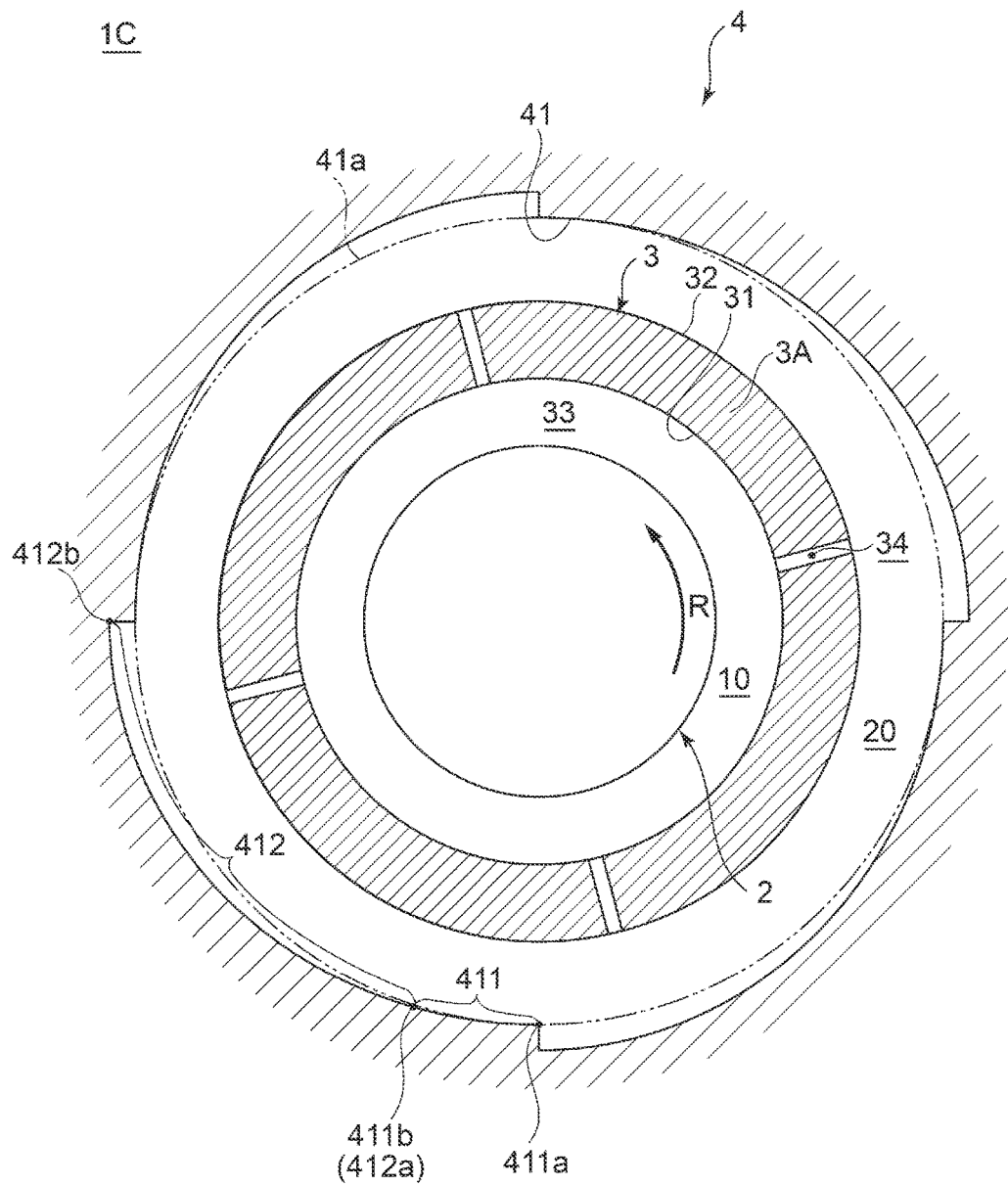
FIG. 3 is a cross-sectional view of a cross section of a floating bush bearing device according to an embodiment of the present invention, taken along the axial direction.

In some embodiments, as depicted in FIGS. 3 and 5, in the floating bush bearing device 1 (1C, 1E), the inner peripheral surface 41 of the bearing housing 4 may be formed to include each of the land portion 411 and the recess portion 412 in a cross section in the axial direction of the bearing housing 4.

In the depicted embodiment, the land portion 411 is formed from the end portion 411a on the side of the rotational direction R of the rotational shaft 2 to the end portion 411b on the opposite side from the rotational direction R. The recess portion 412 is formed from the end portion 412a on the side of the rotational direction R of the rotational shaft 2 to the end portion 412b on the opposite side from the rotational direction R. The end portion 411b of the land portion 411 on the opposite side from the rotational direction R is at the same position as the end portion 412a of the recess portion 412 on the side of the rotational direction R.

According to this embodiment, the gap 20 between the land portion 411 of the inner peripheral surface 41 of the bearing housing 4 and the outer peripheral surface 32 of the floating bush 3 is controlled with high accuracy, and thereby it is possible to suppress non-synchronous oscillation due to tolerance, and to enhance the oscillation stability. Furthermore, a large section of the gap 20 is formed between the inner peripheral surface 41 of the bearing housing 4 and the outer peripheral surface 32 of the floating bush 3, and thereby it is possible to provoke shortage of lubricant oil in the large section of the gap 20 to enhance the oscillation stability.

FIGS. 7 to 12 are an axial-directional cross-sectional view of a cross section of a floating bush bearing device according to an embodiment of the present invention, taken along the axial direction.

In some embodiments, as depicted in FIGS. 7 to 12, in the floating bush bearing device 1 (1F, 1G, 1H, 1I, 1J, 1K), the land portion 311, 321, 411 and the recess portion 312, 322, 412 formed on at least one of the inner peripheral surface 31 of the floating bush 3, the outer peripheral surface 32 of the floating bush 3, or the inner peripheral surface 41 of the bearing housing 4, are formed continuously over the axial direction of the bearing housing 4 or the floating bush 3. Further, the recess portion 312, 322, 412 is formed so that the distance d (d1, d2, d3) between the recess portion 312, 322, 412 and the virtual true circular line 31a, 32a changes in the axial direction.

In the embodiment depicted in FIGS. 7 to 12, the virtual true circular line 31a, 32a, 41a that passes through the land portion 311, 321, 411 extends parallel to the axis CL in the axial direction. That is, the distance d (d1, d2, d3) from the true circular line 31a, 32a changes in the axial direction only at the recess portion 312, 322, 412, and the cross-sectional shape of the land portion 311, 321, 411 does not change in the axial direction.

According to this embodiment, the distance d (d1, d2, d3) between the recess portion 312, 322, 412 and the virtual true circular line 31a, 32a changes in the axial direction. With such recess portions 312, 322, 412, the gap 10, 20 in the axial direction become uneven, which provokes shortage of lubricant oil at sections where the gaps 10, 20 are large. Thus, with at least one of the inner peripheral surface 31 of the floating bush 3, the outer peripheral surface 32 of the floating bush 3, or the inner peripheral surface 41 of the bearing housing 4 being formed to include the above recess portions 312, 322, 412, it is possible to provoke shortage of lubricant oil to enhance the oscillation stability.

Figure 7:
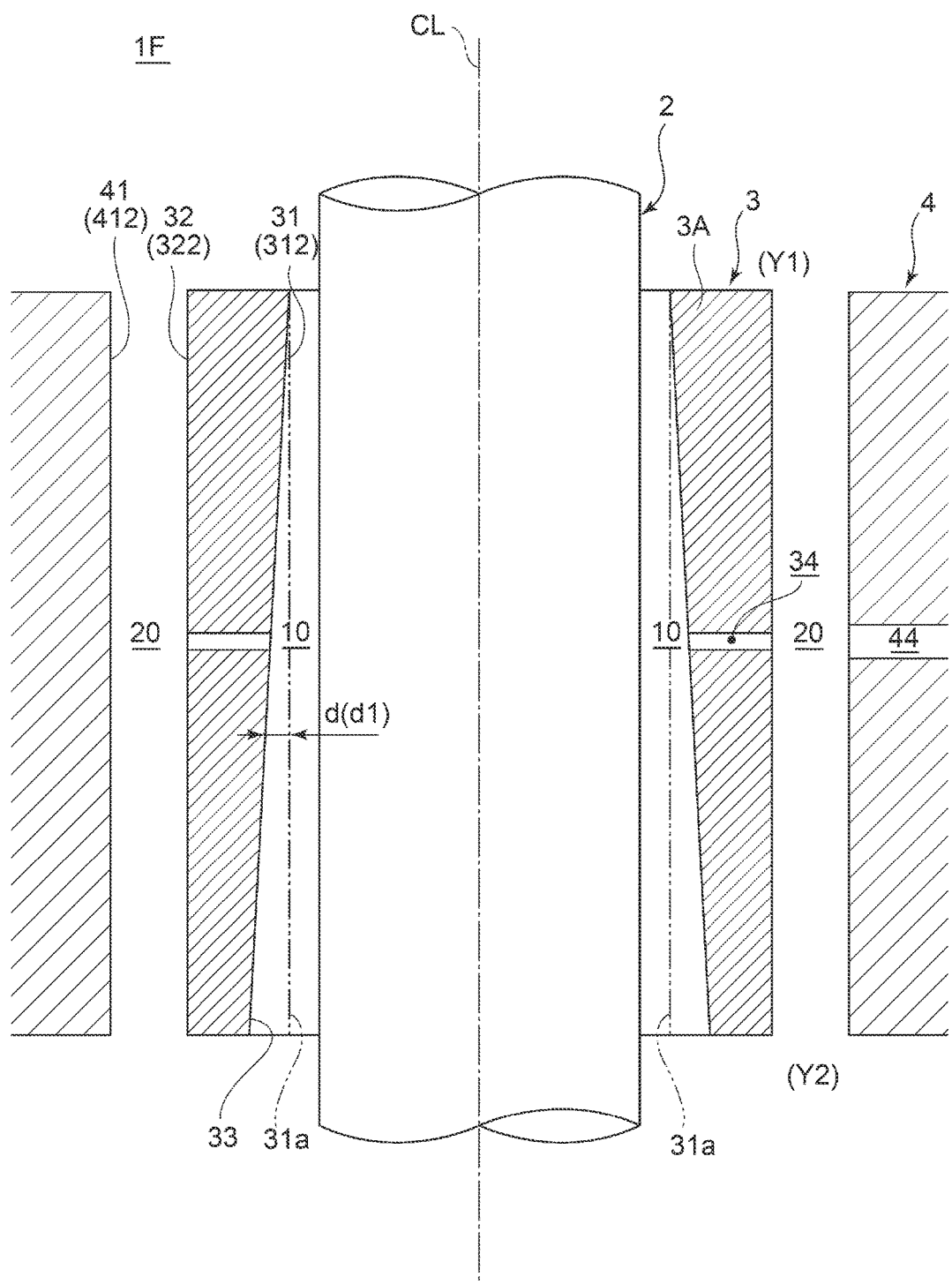
FIG. 7 is an axial-directional cross-sectional view of a cross section of a floating bush bearing device according to an embodiment of the present invention, taken along the axial direction.
Figure 8:
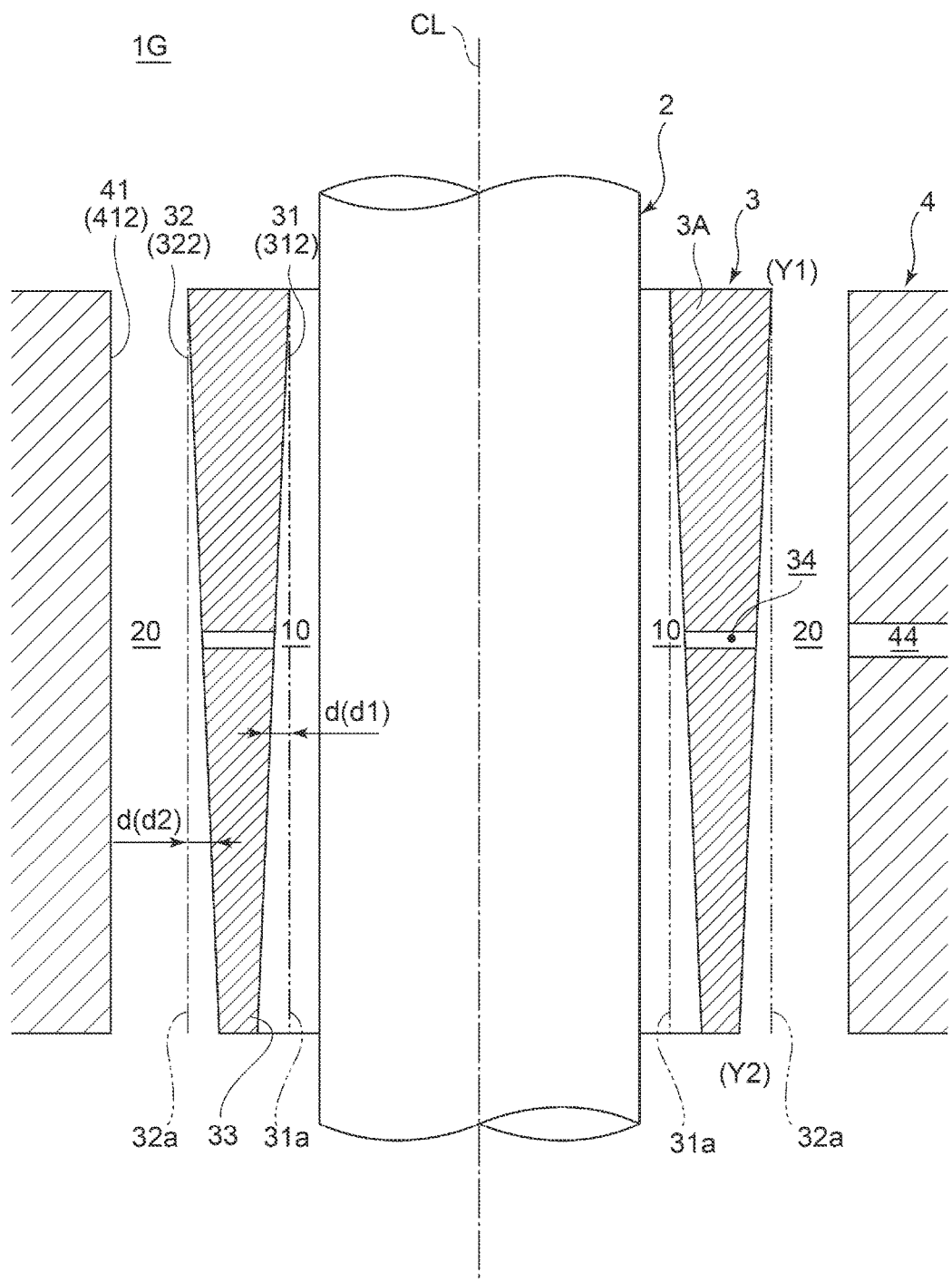
FIG. 8 is an axial-directional cross-sectional view of a cross section of a floating bush bearing device according to an embodiment of the present invention, taken along the axial direction.
Figure 9:
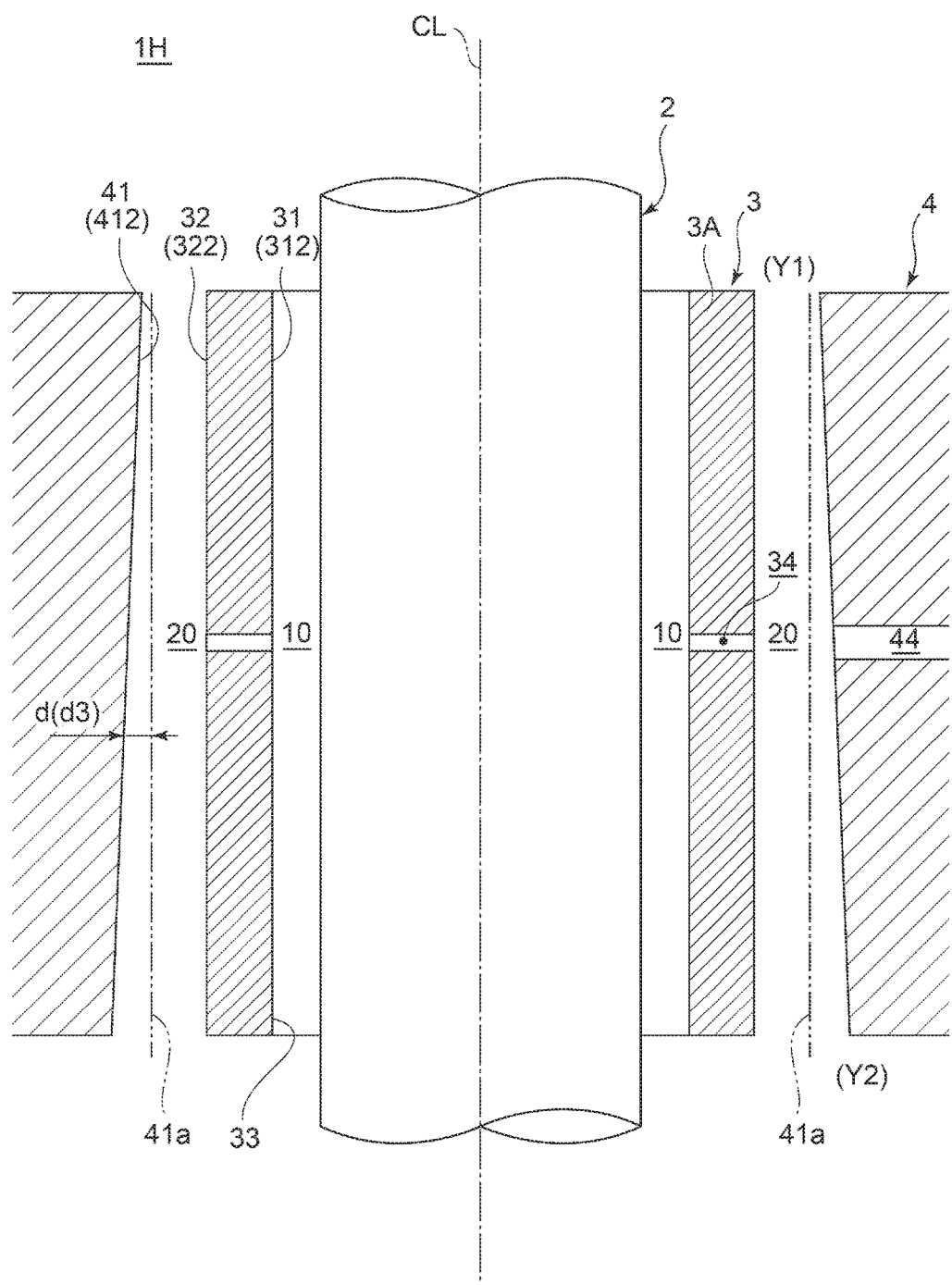
FIG. 9 is an axial-directional cross-sectional view of a cross section of a floating bush bearing device according to an embodiment of the present invention, taken along the axial direction.

In some embodiments, as depicted in FIGS. 7 to 9, in the floating bush bearing device 1 (1F, 1G, 1H), the recess portion 312, 322, 412 is formed so that the distance d (d1, d2, d3) between the recess portion 312, 322, 412 and the virtual true circular line 31a, 32a, 41a increases from the first end side Y1 toward the second end side Y2 in the axial direction.

In the depicted embodiment, the upper side in the drawing is the first end side Y1, and the lower side in the drawing is the second end side Y2. Furthermore, in the embodiment depicted in FIG. 7, on the inner peripheral surface 31 of the floating bush 3, the distance d1 between the recess portion 312 and the virtual true circular line 31a increases from the first end side Y1 toward the second end side Y2 in the axial direction. Furthermore, in the embodiment depicted in FIG. 8, in addition to the configuration depicted in FIG. 7, on the outer peripheral surface 32 of the floating bush 3, the distance d2 between the recess portion 322 and the true circular line 32a increases from the first end side Y1 toward the second end side Y2 in the axial direction. Furthermore, in the embodiment depicted in FIG. 9, on the inner peripheral surface 41 of bearing housing 4, the distance d3 between the recess portion 412 and the virtual true circular line 41a increases from the first end side Y1 toward the second end side Y2 in the axial direction.

According to this embodiment, the gaps 10, 20 in the axial direction become uneven, which provokes shortage of lubricant oil at sections where the gap 10, 20 are large. Thus, it is possible to provoke shortage of lubricant oil to enhance the oscillation stability.

In some embodiments, as depicted in FIG. 8, in the floating bush bearing device 1 (1G), the inner peripheral surface 31 of the floating bush 3 is formed to include each of the land portion 311 and the recess portion 312 in a cross section in the axial direction of the floating bush 3. Furthermore, the outer peripheral surface 32 of the floating bush 3 is formed to include each of the land portion 321 and the recess portion 322 in a cross section in the axial direction of the floating bush 3. Furthermore, each of the recess portion 312 on the inner peripheral surface 31 of the floating bush 3 and the recess portion 322 on the outer peripheral surface 32 of the floating bush 3 is formed so that the distance d (d1, d2) between the recess portion 312, 322 and the virtual true circular line 31a, 32a increases from the first end side Y1 toward the second end side Y2 in the axial direction.

According to this embodiment, large sections of the gaps 10, 20 are formed on the second end side Y2 in the axial direction, between the rotational shaft 2 and the inner peripheral surface 31 of the floating bush 3, and between the outer peripheral surface 32 of the floating bush 3 and the inner peripheral surface 41 of the bearing housing 4. Thus, it is possible to provoke shortage of lubricant oil at the large sections of the gaps 10, 20 to enhance the oscillation stability.

Figure 10:
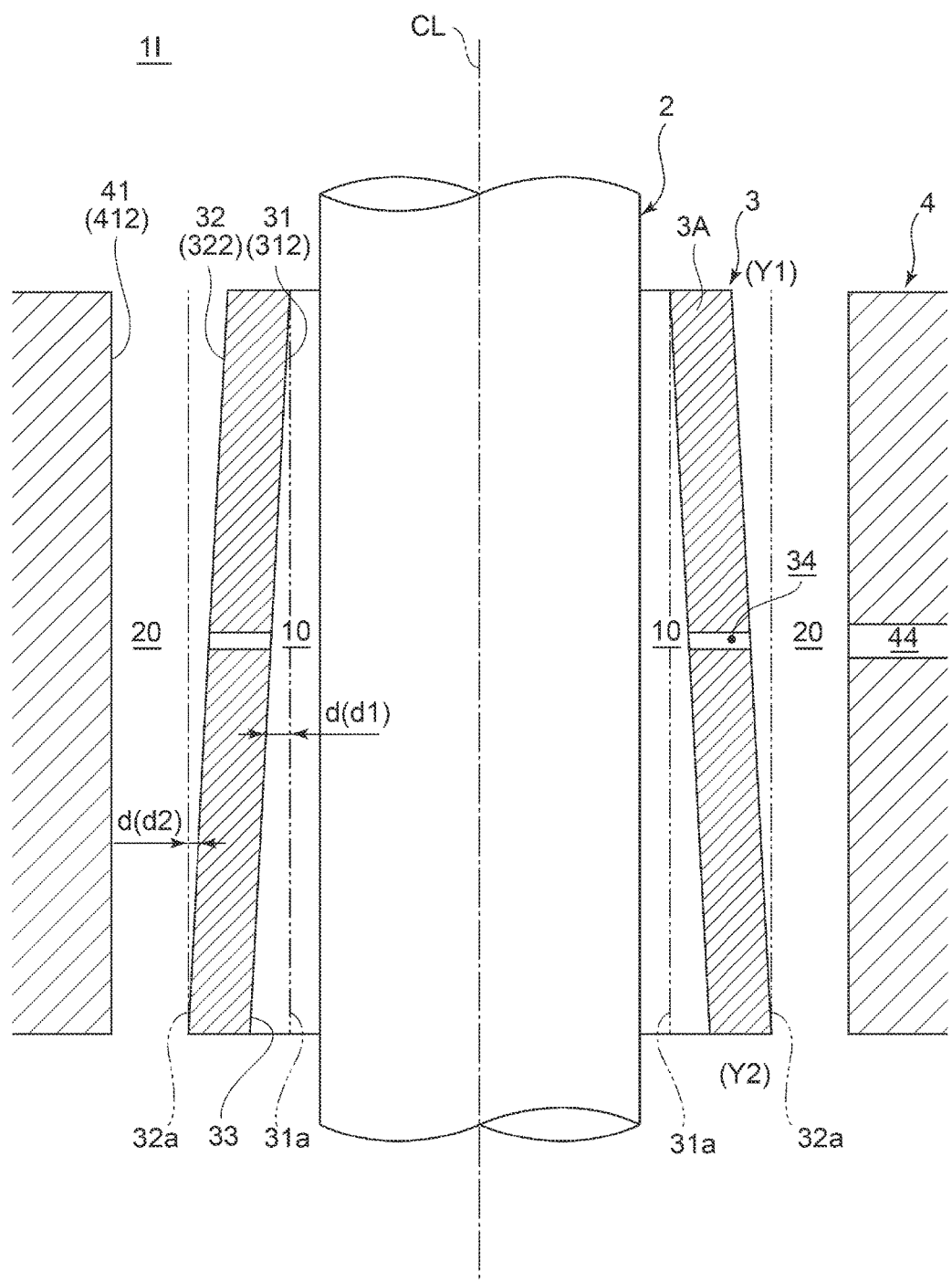
FIG. 10 is an axial-directional cross-sectional view of a cross section of a floating bush bearing device according to an embodiment of the present invention, taken along the axial direction.

In some embodiments, as depicted in FIG. 10, in the floating bush bearing device 1 (1I), the inner peripheral surface 31 of the floating bush 3 is formed to include each of the land portion 311 and the recess portion 312 in a cross section in the axial direction of the floating bush 3. Furthermore, the outer peripheral surface 32 of the floating bush 3 is formed to include each of the land portion 321 and the recess portion 322 in a cross section in the axial direction of the floating bush 3. Furthermore, the recess portion 312 on the inner peripheral surface 31 of the floating bush 3 is formed so that the distance d1 between the recess portion 312 and the virtual true circular line 31a increases from the first end side Y1 toward the second end side Y2 in the axial direction. The recess portion 322 on the outer peripheral surface 32 of the floating bush 3 is formed so that the distance d2 between the recess portion 322 and the virtual true circular line 32a increases from the second end side Y2 toward the first end side Y1 in the axial direction.

According to this embodiment, a large section of the gap 10 is formed on the second end side Y2 in the axial direction, between the rotational shaft 2 and the inner peripheral surface 31 of the floating bush 3. Further, a large section of the gap 20 is formed on the first end side Y1 in the axial direction, between the outer peripheral surface 32 of the floating bush 3 and the inner peripheral surface 41 of the bearing housing 4. Thus, it is possible to provoke shortage of lubricant oil at the large sections of the gaps 10, 20 to enhance the oscillation stability.

Figure 11:
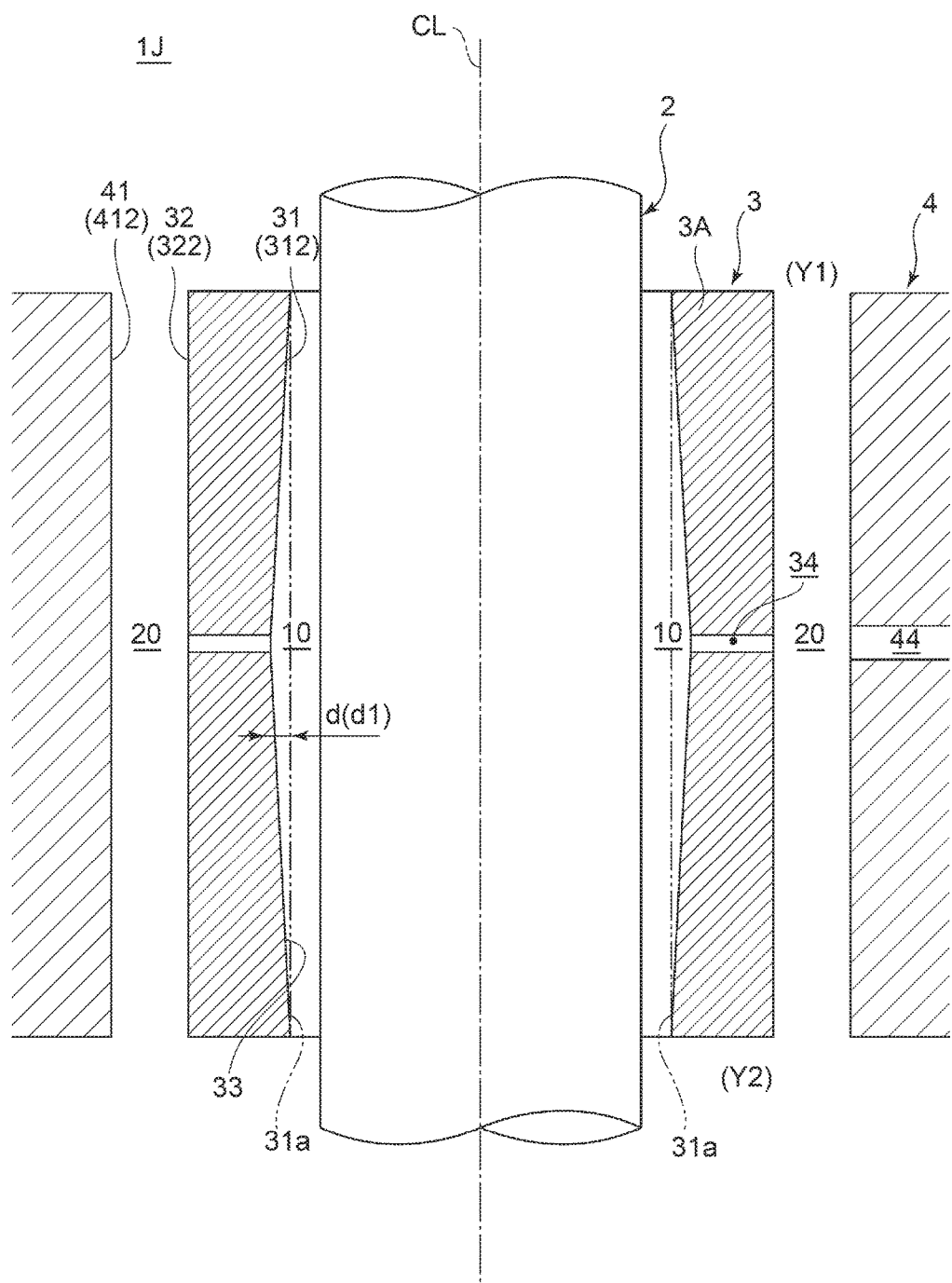
FIG. 11 is an axial-directional cross-sectional view of a cross section of a floating bush bearing device according to an embodiment of the present invention, taken along the axial direction.
Figure 12:
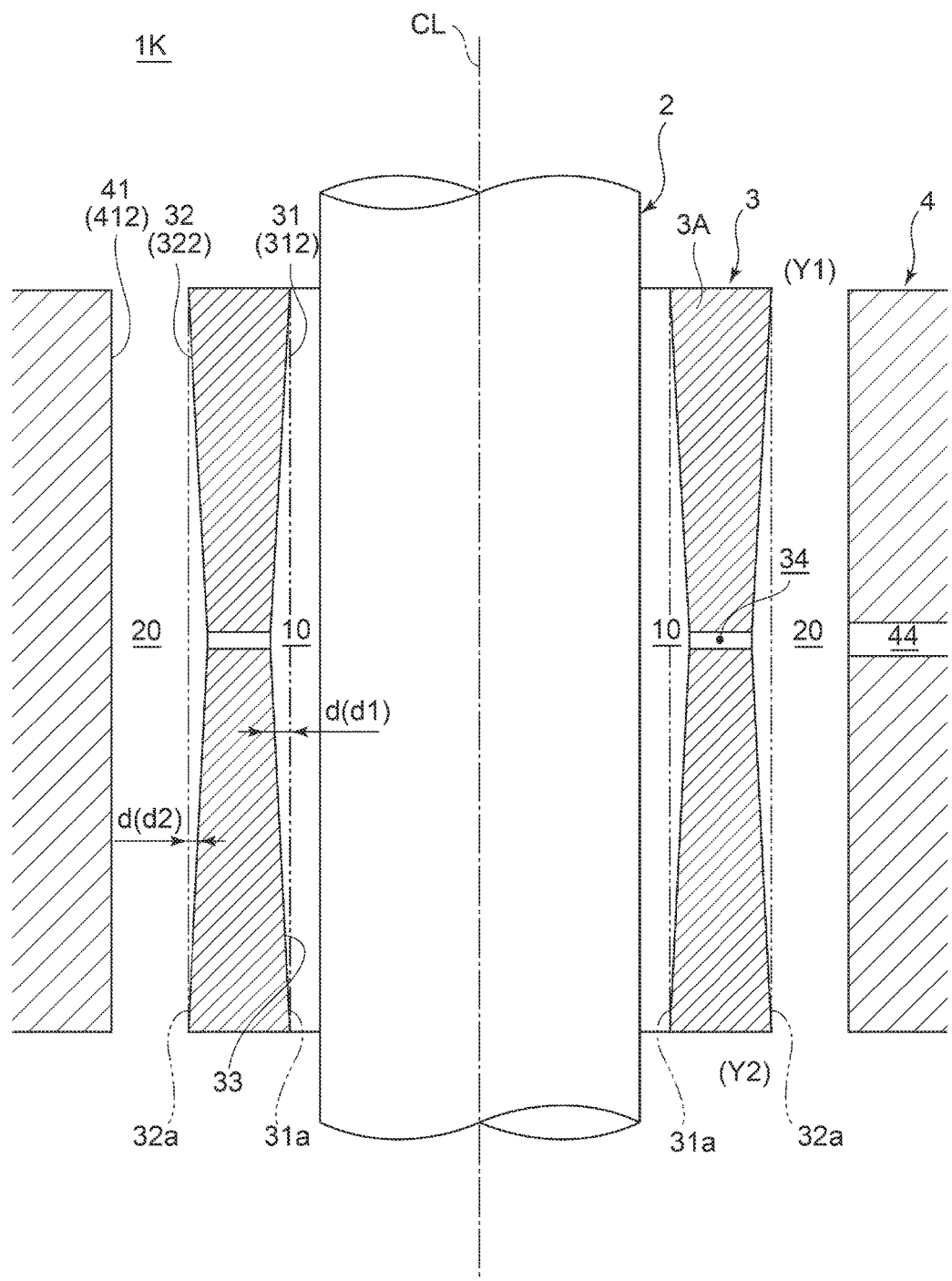
FIG. 12 is an axial-directional cross-sectional view of a cross section of a floating bush bearing device according to an embodiment of the present invention, taken along the axial direction.

In some embodiments, as depicted in FIGS. 11 and 12, in the floating bush bearing device 1 (1J, 1K), the floating bush 3 includes an oil supply hole 34 formed through the peripheral wall 3A of the floating bush 3 having a cylindrical shape. Furthermore, the inner peripheral surface 31 of the floating bush 3 is formed to include each of the land portion 311 and the recess portion 312 in a cross section in the axial direction of the floating bush 3. Furthermore, the recess portion 312 on the inner peripheral surface 31 of the floating bush 3 is formed so that the distance d1 between the recess portion 312 and the virtual true circular line 31a increases from the first end side Y1 and the second end side Y2 toward the oil supply hole 34 in the axial direction.

In the depicted embodiment, the oil supply hole 34 is formed in the central part of the floating bush 3 in the axial direction. Further, at the central part of the bearing housing 4 in the axial direction, a lubricant-oil supply hole 44 for supplying lubricant oil to the gap 20 on the inner peripheral surface 41 of the bearing housing 4 and the outer peripheral surface 32 of the floating bush 3 is formed.

According to this embodiment, the recess portion 312 on the inner peripheral surface 31 of the floating bush 3 is configured such that the gap 10 is greatest in the vicinity of the oil supply hole 34, and decreases toward the first end side Y1 and the second end side Y2 from the oil supply hole 34 in the axial direction. Thus, it is possible to provoke shortage of lubricant oil at the large section of the gap 10 and enhance the oscillation stability. Furthermore, lubricant oil supplied between the rotational shaft 2 and the inner peripheral surface 31 of the floating bush 3 is less likely to leak from the first end side Y1 and the second end side Y2 in the axial direction, and thus it is possible to avoid an event in which lubricant oil falls short over the entire length in the circumferential direction and the axial direction.

In some embodiments, as depicted in FIG. 12, in the floating bush bearing device 1 (1K), the floating bush 3 includes the oil supply hole 34 formed through the peripheral wall 3A of the floating bush 3 having a cylindrical shape. Furthermore, the outer peripheral surface 32 of the floating bush 3 is formed to include each of the land portion 321 and the recess portion 322 in a cross section in the axial direction of the floating bush 3. Furthermore, the recess portion 322 on the outer peripheral surface 32 of the floating bush 3 is formed so that the distance d2 between the recess portion 322 and the virtual true circular line 32a increases from the first end side Y1 and the second end side Y2 toward the oil supply hole 34 in the axial direction.

According to this embodiment, the recess portion 322 on the outer peripheral surface 32 of the floating bush 3 is formed so that the gap 20 is greatest in the vicinity of the oil supply hole 34, and decreases from the first end side Y1 and the second end side Y2 toward the oil supply hole 34 in the axial direction. Thus, it is possible to provoke shortage of lubricant oil at the large section of the gap 20 to enhance the oscillation stability. Furthermore, lubricant oil supplied between the rotational shaft 2 and the inner peripheral surface 31 of the floating bush 3 is less likely to leak from the first end side Y1 and the second end side Y2 in the axial direction, and thus it is possible to avoid an event in which lubricant oil falls short over the entire length in the circumferential direction and the axial direction. Thus, it is possible to increase the flow rate of lubricant oil supplied to the inner peripheral side of the floating bush 3.

Figure 13:
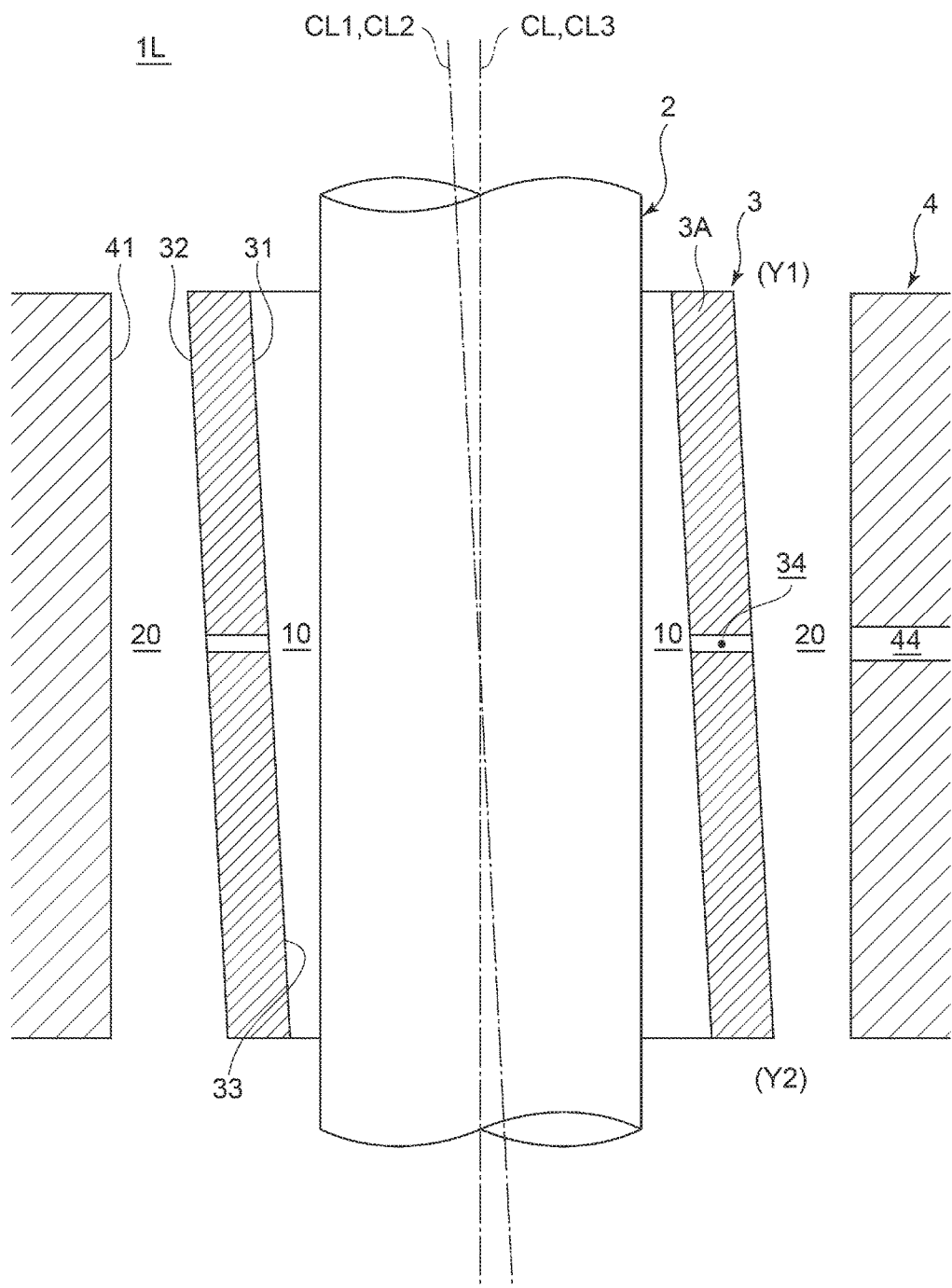
FIG. 13 is an axial-directional cross-sectional view of a cross section of a floating bush bearing device according to an embodiment of the present invention, taken along the axial direction.
Figure 14:
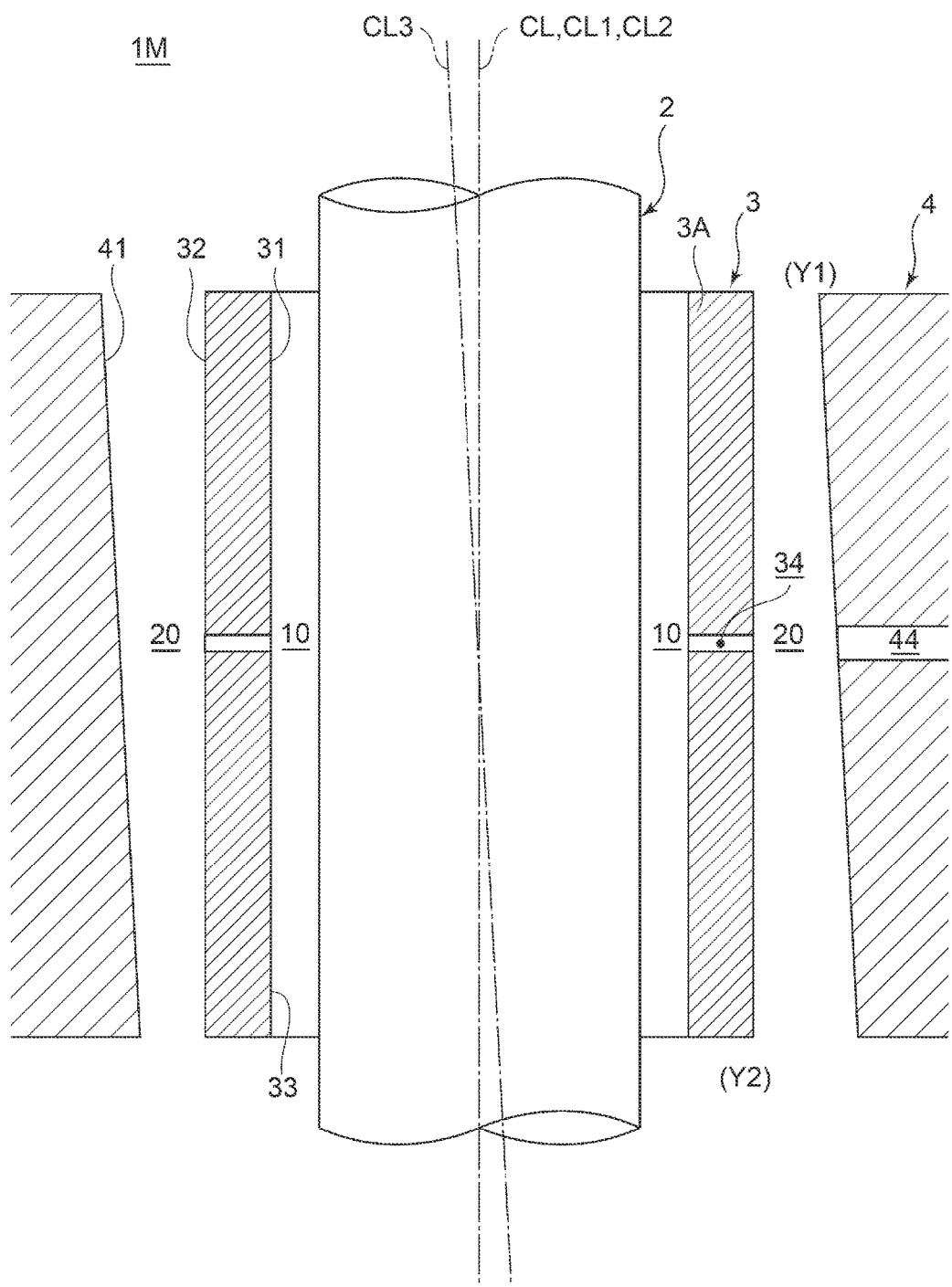
FIG. 14 is a schematic diagram of an embodiment of a supercharger including a floating bush bearing device of the present invention.

In some embodiments, as depicted in FIG. 13, in the floating bush bearing device 1 (1L, 1M), the center line CL1 of the inner peripheral surface 31 of the floating bush 3 is inclined with respect to the center line CL of the rotational shaft 2. Furthermore, as depicted in FIGS. 13 and 14, the center line CL2 of the outer peripheral surface 32 of the floating bush 3 is inclined with respect to the center line CL3 of the inner peripheral surface 41 of the bearing housing 4.

In the embodiment depicted in FIG. 13, the inner peripheral surface 31 and the outer peripheral surface 32 of the floating bush 3 are formed in parallel with each other, and are inclined with respect to the rotational shaft 2 and the bearing housing 4. Accordingly, the gap 10 between the rotational shaft 2 and the inner peripheral surface 31 of the floating bush 3 and the gap 20 between the outer peripheral surface 32 of the floating bush 3 and the inner peripheral surface 41 of the bearing housing 4 are uneven in the axial direction. Furthermore, in the embodiment depicted in FIG. 14, the center line CL3 of the inner peripheral surface 41 of the bearing housing 4 is inclined with respect to each of the center line CL of the rotational shaft 2, the center line CL1 of the inner peripheral surface 31 of the floating bush 3, and the center line CL2 of the outer peripheral surface 32 of the floating bush 3. Accordingly, the gap 20 between the outer peripheral surface 32 of the floating bush 3 and the inner peripheral surface 41 of the bearing housing 4 are uneven in the axial direction.

According to this embodiment, the gap 10 between the rotational shaft 2 and the inner peripheral surface 31 of the floating bush 3, or the gap 20 between the outer peripheral surface 32 of the floating bush 3 and the inner peripheral surface 41 of the bearing housing 4 are uneven in the axial direction, which provokes shortage of lubricant oil at the large sections of the gap 10, 20. Thus, it is possible to provoke shortage of lubricant oil and enhance the oscillation stability.

In some embodiments, in the floating bush bearing device 1 (1A to 1M) depicted in FIGS. 1 to 14 described above, the recess portion 312 formed on the inner peripheral surface 31 of the floating bush 3 is formed by machining the inner peripheral surface of the floating bush having a true circular shape. Furthermore, the recess portion 322 formed on the outer peripheral surface 32 of the floating bush 3 is formed by machining the outer peripheral surface of the floating bush having a true circular shape. Furthermore, the recess portion 412 formed on the inner peripheral surface 41 of the bearing housing 4 is formed by machining the inner peripheral surface of the bearing housing having a true circular shape.

The type of machining may be selected from various methods, such as pressing, roller pressing, cutting and grinding, depending on the type and shape of an object to be machined.

According to this embodiment, the recess portion 312, 322, 412 is formed by machining the inner peripheral surface and the outer peripheral surface of a typical floating bush having a true circular shape and the inner peripheral surface of a bearing housing. Thus, extensive reconstruction of an ongoing production line is not necessary, which is advantageous in terms of productivity and costs.

Figure 15:
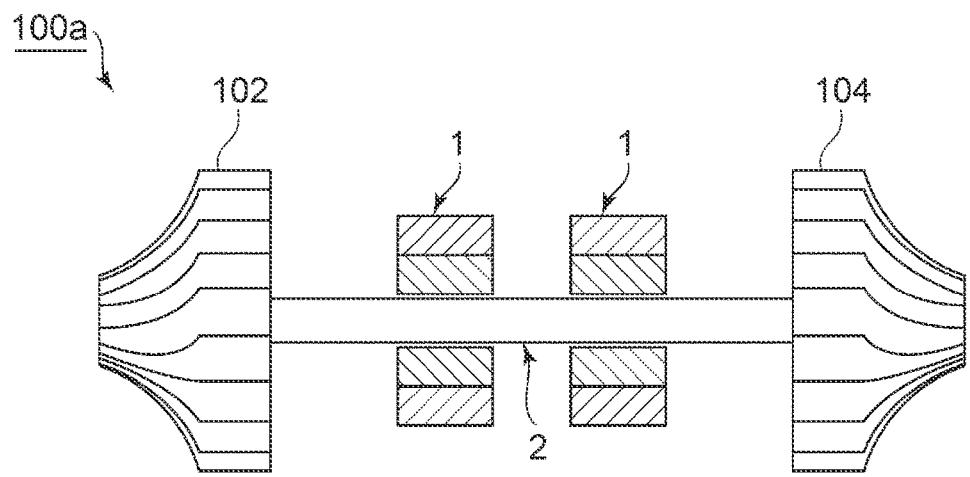
FIG. 15 is a schematic diagram of an embodiment of a supercharger including a floating bush bearing device of the present invention.

FIG. 15 is a schematic diagram of an embodiment of a turbocharger including a floating bush bearing device of the present invention. As depicted in FIG. 15, the supercharger 100 in the present embodiment is configured as a turbocharger 100a which includes a rotational shaft 2, a compressor rotor 102 and a turbine rotor 104 coupled to the opposite ends of the rotational shaft 2, and the above described floating bush bearing device 1 rotatably supporting the rotational shaft 2.

The compressor rotor 102 is disposed in an intake passage of the engine, while the turbine rotor 104 is disposed in an exhaust passage of the engine. The turbine rotor 104 is rotated by exhaust gas discharged from the engine, and thereby the compressor rotor 102 is coaxially driven to compress air flowing through the intake passage and supply the supercharged air to the engine.

With this configuration, it is possible to provide a turbocharger 100a including a floating bush bearing device with an excellent oscillation stability and a reduced bearing loss.

Figure 16:
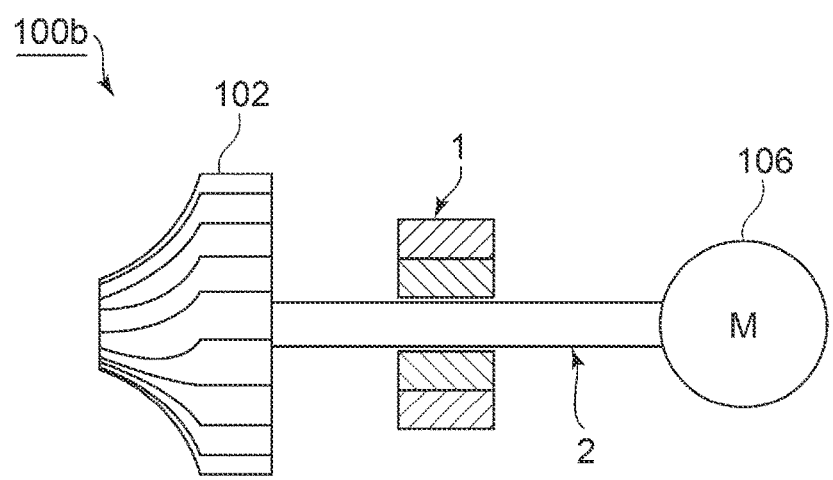
FIG. 16 is a schematic diagram of an embodiment of a supercharger including a floating bush bearing device of the present invention.

The supercharger 100 of the present invention is not limited to the above described turbocharger 100a. As depicted in FIG. 16, the supercharger 100 may be configured as an electric supercharger 100b including an electric motor 106 instead of the turbine rotor 104, so that the electric motor 106 rotates the rotational shaft 2 and drives the compressor rotor 102.

The embodiments of the present invention have been described above. However, the present invention is not limited thereto, and various modifications may be applied as long as they do not depart from the object of the present invention

INDUSTRIAL APPLICABILITY

At least one embodiment of the present invention can be suitably applied to, for instance, a small supercharger to be mounted to an automobile engine, as a floating bush bearing device that rotatably supports a rotational shaft.

DESCRIPTION OF REFERENCE NUMERALS

1 Floating bush bearing device
2 Rotational shaft
3 Floating bush
31 Inner peripheral surface
32 Outer peripheral surface
33 Bearing hole
34 Oil supply hole
3A Peripheral wall
4 Bearing housing
41 Inner peripheral surface
44 Lubricant oil supply hole
10, 20 Gap
31a, 32a, 41a Virtual true circular line
311, 321, 411 Land portion
312, 322, 412 Recess portion
100a Turbocharger
100b Electric supercharger
102 Compressor rotor
104 Turbine rotor
106 Electric motor

The invention claimed is:
1. A floating-bush bearing device for rotatably supporting a rotational shaft for rotation about a center line of the shaft, comprising:
a floating bush having a cylindrical shape centered on said center line and including a bearing hole into which the rotational shaft is to be inserted; and a bearing housing which rotatably houses the floating bush, said bearing housing having a cylindrical shape centered on said center line, wherein at least one of an inner peripheral surface of the floating bush, an outer peripheral surface of the floating bush, and an inner peripheral surface of the bearing housing includes, in a cross section in an axial direction thereof, a plurality of land portions having a true arc shape which is a part of a true circular shape centered on said center line, and a plurality of recess portions being disposed at a position recessed from the land portions, the recess portions being configured such that a distance between the recess portions and a virtual true circular line centered on said center line and passing through the land portions increases in a circumferential direction opposite from the rotational direction of the rotational shaft, wherein said land portions and said recess portions are formed on the inner peripheral surface of the floating bush, wherein said land portions and said recess portions are also formed on the outer peripheral surface of the floating bush, wherein the land portions on the inner peripheral surface of the floating bush and the land portions on the outer peripheral surface of the floating bush bearing are formed in regions which overlap with each other in a circumferential direction, and wherein the recess portions on the inner peripheral surface of the floating bush and the recess portions on the outer peripheral surface of the floating bush are formed in regions which overlap with each other in the circumferential direction.

2. The floating bush bearing device according to claim 1, wherein the floating bush includes an oil supply hole formed through a peripheral wall of the floating bush having a cylindrical shape, and wherein the oil supply hole is formed at a position which overlaps with an end portion of a land portion or with an end portion of a recess portion as seen in the axial direction.

3. The floating bush bearing device according to claim 1, wherein said land portions and said recess portions are formed on the inner peripheral surface of the bearing housing.

4. The floating bush bearing device according to claim 1, wherein a center line of the inner circumferential surface of the floating bush is inclined from the center line of the rotational shaft.

5. The floating bush bearing device according to claim 1, wherein the recess portions formed on at least one of the inner peripheral surface of the floating bush, the outer peripheral surface of the floating bush, and the inner peripheral surface of the bearing housing are formed by machining the respective surface having a true circular shape.

6. A supercharger, comprising:
a rotational shaft;
a compressor wheel coupled to an end portion of the rotational shaft; and
the floating bush bearing device according to claim 1.

7. The floating bush bearing device according to claim 1, wherein a center line of the outer peripheral surface of the floating bush is inclined from a center line of the inner peripheral surface of the bearing housing.

8. A floating-bush bearing device for rotatably supporting a rotational shaft for rotation about a center line of the shaft, comprising:
a floating bush having a cylindrical shape centered on said center line and including a bearing hole into which the rotational shaft is to be inserted; and
a bearing housing which rotatably houses the floating bush, said bearing housing having a cylindrical shape centered on said center line, wherein at least one of an inner peripheral surface of the floating bush, an outer peripheral surface of the floating bush, and an inner peripheral surface of the bearing housing includes, in a cross section in an axial direction thereof, a plurality of land portions having a true arc shape which is apart of a true circular shape centered on said center line, and a plurality of recess portions being disposed at a position recessed from the land portions, the recess portions being configured such that a distance between the recess portions and a virtual true circular line centered on said center line and passing through the land portions increases in a circumferential direction opposite from the rotational direction of the rotational shaft, wherein the land portions and the recess portions formed on at least one of the inner peripheral surface of the floating bush, the outer peripheral surface of the floating bush, and the inner peripheral surface of the bearing housing are formed continuously over the axial length of the bearing housing or the floating bush, wherein the recess portions are formed so that a distance between the recess portions and the virtual true circular line passing through the land portions of the inner peripheral surface of the floating bush, the land surfaces of the outer peripheral surface of the floating bush, or the land surfaces of the inner peripheral surface of the bearing housing, respectively, changes in the axial direction, and the land portions are formed so that a distance between the land portions and the virtual true circular line does not change in the axial direction.

9. The floating bush bearing device according to claim 8, wherein the recess portions are formed so that the distance between the recess portions and the respective virtual true circular line increases from a first end toward a second end in the axial direction.

10. The floating bush bearing device according to claim 8, wherein the inner peripheral surface of the floating bush is formed so as to include each of the land portions and the recess portions in a cross section in the axial direction of the floating bush, wherein the outer peripheral surface of the floating bush is formed so as to include each of the land portions and the recess portions in a cross section in the axial direction of the floating bush, and wherein each of the recess portions on the inner peripheral surface of the floating bush and the recess portions on the outer peripheral surface of the floating bush is formed so that a distance between the recess portion and the respective virtual true circular line increases from a first end toward a second end in the axial direction.

11. The floating bush bearing device according to claim 8, wherein the inner peripheral surface of the floating bush is formed so as to include each of the land portions and the recess portions in a cross section in the axial direction of the floating bush, wherein the outer peripheral surface of the floating bush is formed so as to include each of the land portions and the recess portions in a cross section in the axial direction of the floating bush, wherein the recess portions on the inner peripheral surface of the floating bush are formed so that a distance between the recess portions and the respective virtual true circular line increases from a first end toward a second end in the axial direction, and wherein the recess portions on the outer peripheral surface of the floating bush are formed so that a distance between the recess portions and the respective virtual true circular line increases from the second end toward the first end in the axial direction.

12. The floating bush bearing device according to claim 8, wherein the floating bush includes an oil supply hole formed through a peripheral wall of the floating bush having a cylindrical shape, wherein the inner peripheral surface of the floating bush is formed so as to include each of the land portions and the recess portions in a cross section in the axial direction of the floating bush, and wherein the recess portions on the inner peripheral surface of the floating bush are formed so that a distance between the recess portions and the virtual true circular line passing through the land portions of the inner peripheral surface of the floating bush increases from a first end and a second end in the axial direction toward the oil supply hole.

13. The floating bush bearing device according to claim 8, wherein the floating bush includes an oil supply hole formed through a peripheral wall of the floating bush having a cylindrical shape, wherein the outer peripheral surface of the floating bush is formed so as to include each of the land portions and the recess portions in a cross section in the axial direction of the floating bush, and wherein the recess portions on the outer peripheral surface of the floating bush are formed so that a distance between the recess portions and the virtual true circular line passing through the land portions of the outer peripheral surface of the floating bush increases from a first end and a second end in the axial direction toward the oil supply hole.

* * * * *